US012786256B2

(12) United States Patent
Seed et al.

(10) Patent No.: US 12,786,256 B2
(45) Date of Patent: Nov. 3, 2026

(54) MANAGING MULTI-USER SESSIONS IN EDGE DATA NETWORKS

(71) Applicant: InterDigital Patent Holdings, Inc., Wilmington, DE (US)

(72) Inventors: Dale Seed, Allentown, PA (US); Quang Ly, North Wales, PA (US); Catalina Mladin, Hatboro, PA (US); Lu Liu, Conshohocken, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 46 days.

(21) Appl. No.: 18/862,612

(22) PCT Filed: May 9, 2023

(86) PCT No.: PCT/US2023/021518
§ 371 (c)(1),
(2) Date: Nov. 4, 2024

(87) PCT Pub. No.: WO2023/220047
PCT Pub. Date: Nov. 16, 2023

(65) Prior Publication Data

US 2025/0350651 A1 Nov. 13, 2025

Related U.S. Application Data

(60) Provisional application No. 63/339,663, filed on May 9, 2022.

(51) Int. Cl.
*H04L 65/403* (2022.01)
*H04L 65/1069* (2022.01)

(52) U.S. Cl.
CPC ........ *H04L 65/403* (2013.01); *H04L 65/1069* (2013.01)

(58) Field of Classification Search
CPC .......................... H04L 65/1069; H04L 65/403
(Continued)

(56) References Cited

U.S. PATENT DOCUMENTS

| | | | | |
|---|---|---|---|---|
| 8,374,106 | B2 * | 2/2013 | Whitney | H04L 65/403 379/202.01 |
| 9,729,347 | B2 * | 8/2017 | Layman | H04L 65/403 |

(Continued)

FOREIGN PATENT DOCUMENTS

WO WO-2023220047 A1 * 11/2023 ......... H04L 65/1069

OTHER PUBLICATIONS

3rd Generation Partnership Project (3GPP), "Study on Enhanced architecture for enabling Edge Applications", (Release 18), Technical Specification Group Services and System Aspects, 3GPP TR 23.700-98 V0.6.0, Apr. 2022, 106 pages.

(Continued)

*Primary Examiner* — David P Zarka
(74) *Attorney, Agent, or Firm* — Flaster Greenberg, P.C.

(57) ABSTRACT

A first edge enabler server (EES) may receive a first request to establish a multi-user session between a first application client (AC) and a second AC. The first request may include multi-user session information. The first EES may establish the multi-user session between the first AC and the second AC, for example by sending one or more requests to different edge application servers (EASs). The first EES may receive one or more responses from the different EASs. Based on the one or more responses from the different EASs for example, the first EES may determine that the multi-user session has been established.

20 Claims, 17 Drawing Sheets

(58) Field of Classification Search
USPC .......................................................... 709/204
See application file for complete search history.

(56) References Cited

U.S. PATENT DOCUMENTS

| | | | | |
|---|---|---|---|---|
| 10,892,975 | B2 * | 1/2021 | Khan | H04L 45/02 |
| 2009/0023455 | A1 * | 1/2009 | Gupta | H04L 67/1001 455/453 |
| 2009/0268008 | A1 * | 10/2009 | Topits | H04L 65/403 709/204 |
| 2010/0134589 | A1 * | 6/2010 | Zhang | H04N 7/152 348/14.09 |
| 2010/0235528 | A1 * | 9/2010 | Bocharov | H04L 67/568 709/248 |
| 2011/0069642 | A1 * | 3/2011 | Karam | H04L 65/1046 370/468 |
| 2011/0110235 | A1 * | 5/2011 | Ukita | H04L 47/32 370/252 |
| 2011/0252127 | A1 * | 10/2011 | Iyengar | H04L 67/1008 709/227 |
| 2015/0057006 | A1 * | 2/2015 | Gao | H04W 56/002 455/450 |
| 2015/0379424 | A1 * | 12/2015 | Dirac | G06N 20/00 706/12 |
| 2020/0409949 | A1 * | 12/2020 | Saxena | G06F 16/285 |
| 2022/0295353 | A1 * | 9/2022 | Gautam | H04L 41/5051 |
| 2022/0353733 | A1 * | 11/2022 | Vankayala | H04W 28/0284 |
| 2025/0351012 | A1 * | 11/2025 | Agnel | H04L 65/612 |

OTHER PUBLICATIONS

3rd Generation Partnership Project (3GPP), "Architecture for enabling Edge Applications", (Release 17), Technical Specification Group Services and System Aspects, 3GPP TS 23.558 V17.3.0, Mar. 2022, 166 pages.

Apple, "Pseudo-CR on Solution proposal for Key issue #17: Discovery of a common EAS", 3GPP TSG-SA WG6 Meeting #48-e, S6-220955, Apr. 2022, pp. 6.

Samsung, "Pseudo-CR on Solution to KI#17", 3GPP TSG-SA WG6 Meeting #48-e, S6-220871, Apr. 2022, pp. 7.

* cited by examiner

MANAGING MULTI-USER SESSIONS IN EDGE DATA NETWORKS

CROSS-REFERENCE TO RELATED APPLICATIONS

This application is the National Stage Application of International Patent Application No. PCT/US2023/021518, filed May 9, 2023, which claims the benefit of U.S. Provisional Patent Application No. 63/339,663, filed on May 9, 2022, entitled "Methods to Manage Multi-User Sessions in Edge Data Networks," the contents of which are hereby incorporated by reference herein.

BACKGROUND

Edge enabler layer (EEL) refers to the overall functionality provided by the entities such as edge enabler clients (EECs), edge enabler servers (EESs), or edge configuration servers (ECSs), necessary for enabling user equipment (UE) Application Clients (ACs) to interact with edge application servers (EASs) over 3GPP networks.

This background information is provided to reveal information believed by the applicant to be of possible relevance. No admission is necessarily intended, nor should be construed, that any of the preceding information constitutes prior art.

SUMMARY

Disclosed herein are methods, systems, and devices that may assist in managing multi-user sessions in edge data networks. The disclosed subject matter may address different types of multi-user session synchronization functionality and may enable the EEL to alleviate ACs and EASs from the burden of having to manage multi-user sessions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
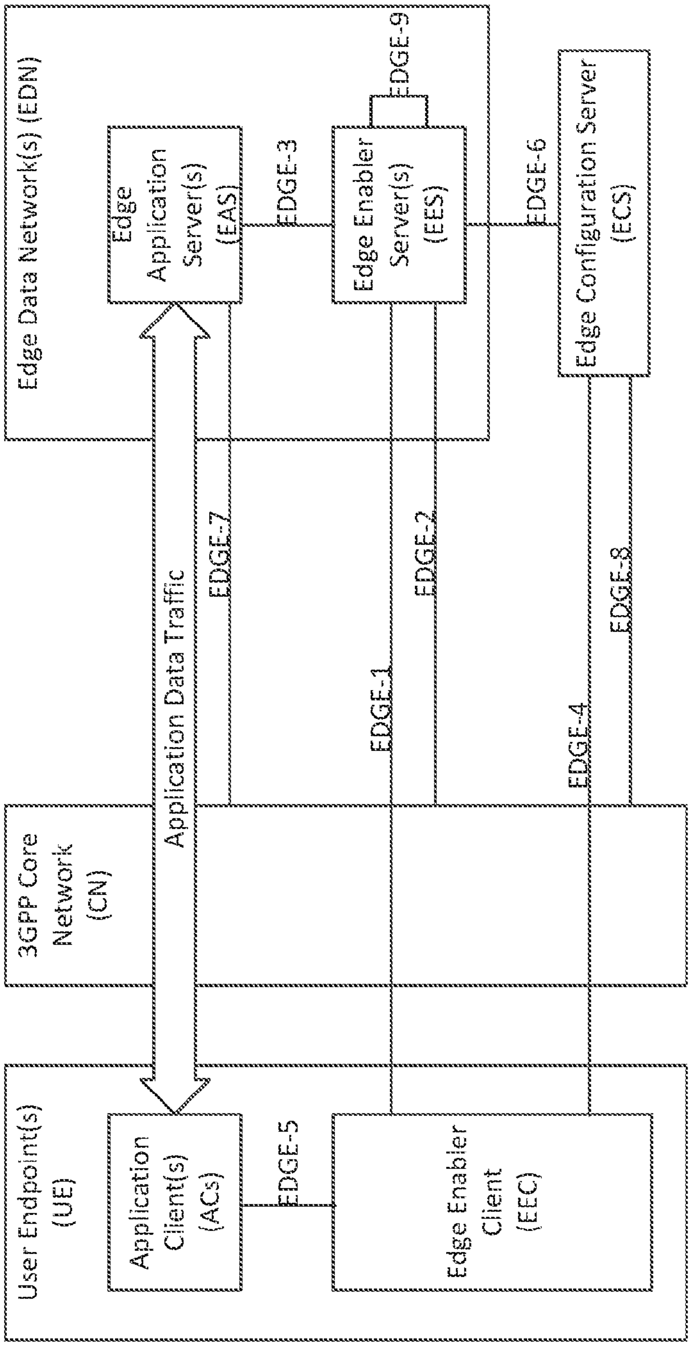
FIG. 1 illustrates an exemplary edge application enabler layer (EEL) architecture.

FIG. 1 illustrates the edge application enabler layer (EEL) architecture defined by the 3GPP SA6 working group (3GPP TS 23.558). For edge computing, it may be important that UE ACs are able to locate and connect with the most suitable EASs available within the edge data networks (EDNs) that the UEs are located in. This may be dependent on the needs of the ACs and the availability of EASs in the edge data networks. The EEL supports a set of services and exposes these services via APIs defined for each of the EEL defined reference points (e.g., EDGE-1 thru EDGE-9 of FIG. 1).

Some of the services may include: 1) Services for discovery of ECSs and provisioning of edge computing services based on a UEs location and service requirements; 2) Services for registration of EECs to EESs and EASs to EESs; 3) Services for providing continuity or service between ACs and EASs (e.g., when a UE moves from one EDN to another EDN); or 4) Exposure of 5GC services for use by EASs.

Edge Application Server Synchronization: Key Issue #13 of the 3GPP SA6 Release 18 study on enhanced EDGEAPP (3GPP TR 23.700-98) recognizes the need for supporting synchronization between EAS instances that support the same type of service, from the same ASP, but deployed in different EDNs. For example, use cases such as multi-user gaming sessions that leverage edge computing for enhanced user experience (e.g., lower latency and lag). For these types of edge deployment use cases, the users will not always be co-located in the same EDN. Some users will be located in different EDNs based on their location. Hence these users will not be able to access a common EAS instance when taking part in a multi-user session. Instead, these multi-user session participants will need to access different EAS instances deployed locally within their respective EDNs. As a result, synchronization may be required between these EASs to ensure the multi-user session participants are provided with an optimal user experience even though they are not using a common EAS.

Figure 2:
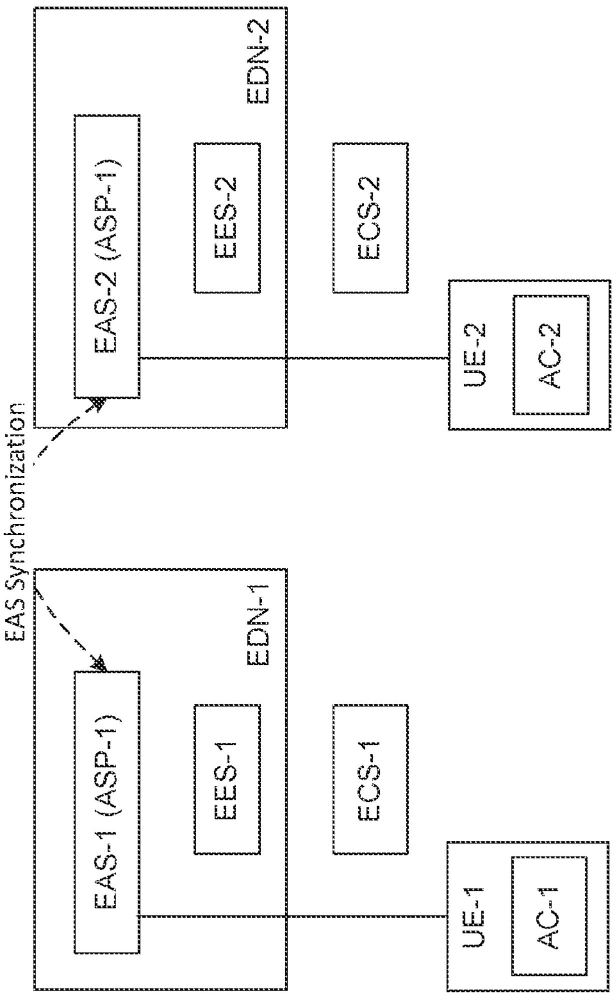
FIG. 2 illustrates exemplary EAS instances (with same service) deployed by same ASP in different EDNs.

FIG. 2 illustrates an example in which EAS synchronization is required. In this example, two UEs (e.g., UE-1 and UE-2) are located in different EDNs (e.g., EDN-1 and EDN-2). Within each EDN, an application service provider (ASP-1) deploys separate instances of its application service (e.g., EAS-1 and EAS-2) to provide users (e.g., AC-1 and AC-2) with enhanced (e.g., lower latency and lag) edge-based service. Due to the nature of the use case (e.g., multi-user gaming), the ACs engage in a multi-user session with one another. However, since the UEs that host the ACs are located in different EDNs, the ACs perform this interaction through the use of different EAS instances. To support the multi-user session between the ACs, synchronization is required between the EAS instances.

For use cases such as the one shown in FIG. 2 for multi-user session synchronization between EAS instances supporting the same type of service from the same ASP, but deployed in different EDNs, the 3GPP SA6 Release 18 eLDGEAPP study has yet to define functionality within the EEL to support the management of multi-user sessions.

The EEL may lack the following synchronization functionality in support of multi-user sessions. The EEL may lack support for assisting with the synchronized sharing of application data across EAS instances for multi-user session ACs. The EEL may lack synchronization of the types or instances of network slices used by each of the multi-user session participants (e.g., ACs) for communicating with their respective EAS instances. The EEL may lack synchronization of session QoS configurations used by each of the multi-user session participants (e.g., ACs) when communicating with their respective EAS instances. The EEL may lack synchronization of the application traffic influence configurations (e.g., user plane latency requirement, schedule, location, routing requirements) used by each of the multi-user session participants (e.g., ACs) when communicating with their respective EAS instances. The EEL may lack synchronization of the communication pattern configurations (e.g., scheduled communication time, traffic profile, stationary indicator for UE or Group) used by each of the multi-user session participants (e.g., ACs) when communicating with their respective EAS instances. The EEL may lack synchronization of the packet flow descriptor configurations (e.g., IPFilterRule AVP for UE or Group) used by each of the multi-user session participants (e.g., ACs) when communicating with their respective EAS instances. The EEL may lack synchronization of the network parameter configuration (e.g., influence PSM or eDRX for a UE or Group) used by each of the multi-user session participant UEs when communicating with their respective EAS instances. The EEL may lack coordination of the group management operations (e.g., group creation, modification, or termination) pertaining to multi-user session participants (e.g., UEs) and synchronization of group related information (e.g., group identifier, group members) across the multi-user session EASs. The EEL may lack coordination of the dynamic instantiation of EASs for use in a multi-user session such that: 1) the EASs are configured and instantiated in a synchronized fashion; 2) the EASs' configurations, settings and allocated resources are synchronized with one another, or 3) the EASs are equipped to provide services with comparable KPIs to multi-user session ACs.

The lack of support for the above functionality in the EEL pushes the onus of performing these tasks completely upon the individual ACs and EASs participating in a multi-user session. For example, ACs and EASs are not well-positioned in the system to ensure each of the ACs in a multi-user session experience the same KPIs/KQIs (e.g., data rate, latency, jitter, reliability) when interacting with their respective EASs. This can result in an imbalance in the level of network and application service provided to the different ACs and EASs involved in a multi-user session. This imbalance can ultimately result in a lack of end-to-end synchronization between users (e.g., UEs) that interact with one another during a multi-user session. This can result in non-optimal QoE for multi-user session participants. For example, an imbalance in edge data network resources allocated to the different ACs and EASs for a multi-user gaming session can result in some users having lower latency, lower jitter, and higher bandwidth than others. This may result in unfair advantages for some users over others or hamper the ability for users having these imbalances to effectively interact with one another. Relying on ACs and EASs to manage these types of synchronization, may also add considerable overhead and burden to these ACs and EASs especially since these entities may not have complete or timely visibility and awareness to multi-user session. This may especially be the case when changes occur to multi-user sessions such as ACs transitioning to different EASs due to events, such as mobility or overloading. In contrast, the EEL is uniquely positioned in the 5G system to have complete and timely awareness of each of the UEs, ACs and EASs involved in a multi-user session and the EDNs they reside in.

For use cases, such as the one shown in FIG. 2, that require multi-user session synchronization between EAS instances supporting the same type of service from the same ASP, but deployed in different EDNs, the subject matter herein discloses ways to manage multi-user sessions in edge data networks (EDNs). The disclosed subject matter may address the aforementioned types of multi-user session synchronization functionality that is conventionally lacking in the SA6 defined EEL and may enable the EEL to alleviate ACs and EASs from the burden of having to manage multi-user sessions.

The disclosed service enablement may include functionality with regard to a multi-user session server (MSS), a multi-user session client (MSC), an edge enabler client (EEC), or an edge enabler server.

In an example, a multi-user session server (MSS) may be configured to: receive requests from a multi-user session client (MSC) for establishing, modifying, discovering, subscribing to, or tearing-down a multi-user session involving multiple EAS instances supporting the same type of service from the same ASP, but deployed in different EDNs. Thethe request may include information elements defined in Table 1. The request by authenticating the MSC, checking if the MSC is authorized to perform the multi-user session request, and if authorized, perform the requested multi-user session establishment, modification, discovery, subscription or tear down operation. One or more requests may be initiated to other entities in the system, such as a group management server, network exposure function, OAM servers, or another MSS to perform one or more operations defined in Table 2. There may be a response to the MSC including a status of the multi-user session operation performed and one or more information elements defined in Table 1. A multi-user session notification may be sent to a MSC when an event of interest defined within the notification criteria of a multi-user session subscription is detected.

In an example, a multi-user session client (MSC) may be configured to: transmit requests to a multi-user session server (MSS) for establishing, modifying, discovering, subscribing to, or tearing-down a multi-user session involving multiple EAS instances supporting the same type of service from the same ASP, but deployed in different EDNs. The request may include information elements defined in Table 1. A response may be received from the MSS including a status of the multi-user session operation performed and one or more information elements defined in Table 1. A multi-user session notification may be received from the MSS when an event of interest defined within the notification criteria of a multi-user session subscription is detected.

In an example, an edge enabler client (EEC) may be configured to: receive request(s) from AC(s) that may include multi-user session information defined in Table 1.

The request(s) may be transmitted to an EES or ECS comprising multi-user session information defined in Table 1, wherein the requests may be a registration request, service provisioning request, or a dedicated multi-user session request.

In an example, an edge enabler server (EES) may be configured to: receive request(s) from EEC(s) or EAS(s) comprising multi-user session information defined in Table 1, wherein the requests may be a registration request or a dedicated multi-user session request. Subscriptions requests may be received from EAS(s) that may include notification criteria specifying a multi-user session ID or multi-user session event of interest (e.g., multi-user session establishment, modification, or tear down related events, etc.). The occurrence of multi-user session related events defined within the subscription may be monitored, wherein the EES may in turn subscribe to other entity(s) in the system to assist it with detecting multi-user session events. Multi-user session information may be shared with other EESs and this information may be used to synchronize the multi-user session aware operations performed by the EESs. One or more multi-user session aware operations defined in Table 2 may be performed. Other EESs may be subscribed to receive notifications regarding multi-user session events. A multi-user session notification may be received that includes information regarding a multi-user session event that has occurred and multi-user session aware operations defined in Table 2 may be performed to synchronize multi-user session resources across edge data networks. Multi-user session notifications may be received to other EESs or EASs that include information regarding a multi-user session event that has occurred.

Figure 3:
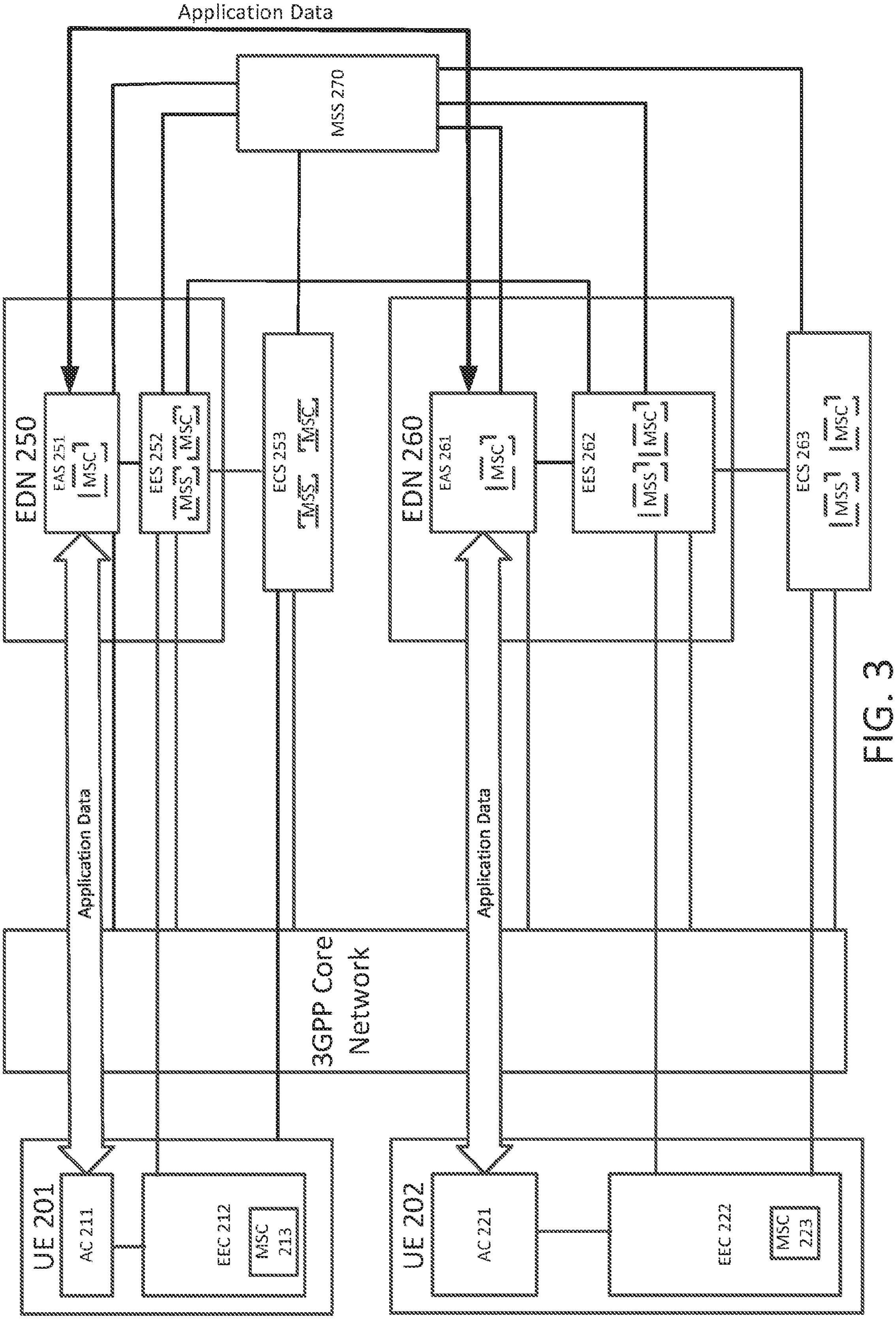
FIG. 3 illustrates an example of multi-user session functionality.

Edge-based Multi-user Session Architecture: For use cases, such as shown in FIG. 2, that implement multi-user session synchronization between EAS instances supporting the same type of service from the same ASP, but deployed in different EDNs (e.g., EDN 250 and EDN 260), enhancements to the 3GPP SA6 defined EDGEAPP architecture are defined as shown in FIG. 3. Existing entities within the EDGEAPP architecture (e.g., AC 211, AC 221, EEC 212, EEC 222, EES 252, EES 262, EAS 251, EAS 261, ECS 253, or ECS 263) may be enhanced to support multi-user session functionality. The multi-user session functionality may include multi-user session server (MSS) 270 or multi-user session client (MSC) functionality (e.g., MSC 213 or MSC 223).

MSS 270 may support capabilities such as managing the establishment, modification, discovery, or tear down of sessions between multiple users that interact with one another via different EASs supporting the same type of service from the same ASP, but deployed in different EDNs. In one example, MSS 270 may be realized as a new standalone entity within the EEL architecture. Alternatively, MSS 270 may be realized as a logical entity embedded within one or more existing entities in the EEL architecture (e.g., EES 252 or ECS 253), as shown in FIG. 3. Alternatively, MSS 270 may be realized as functionality within a cloud application server, group management server, or SEAL server which is not shown in FIG. 3.

MSC 213 may support capabilities for initiating multi-user session operations with MSS 270. For example, triggering MSS 270 to perform multi-user session establishment, modification, discovery, or tear-down operations. In one example, MSC 213 may be realized as a logical entity embedded within EEL entities (e.g., EEC 212, ECS 253, EES 252) as shown in FIG. 3. Alternatively, MSC 213 may be realized as functionality within an EAS 251 as shown in FIG. 3. Alternatively, MSC 213 may be realized as separate functionality hosted on a UE (e.g., standalone UE function or functionality of one or more ACs on the UE) which is not shown in FIG. 3.

Multi-user Session Lifecycle Operations: Based on the multi-user session architectural enhancements captured in FIG. 3, corresponding procedures and operations are defined in FIG. 4 to support lifecycle operations (e.g., establishment, modification, discovery, or tear-down) for multi-user sessions.

Figure 4:
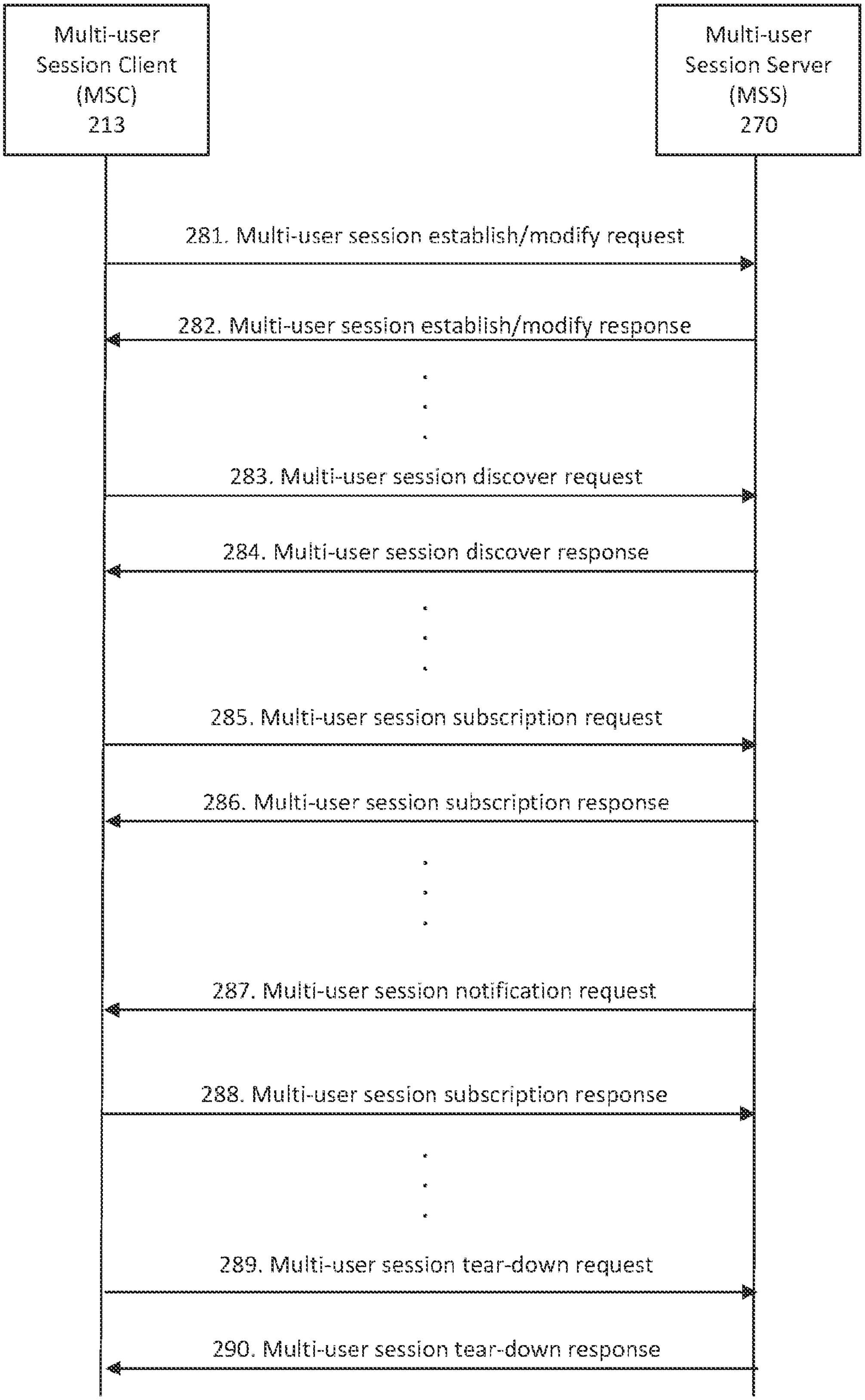
FIG. 4 illustrates an example of multi-user session life-cycle operations.
Figure 5A:
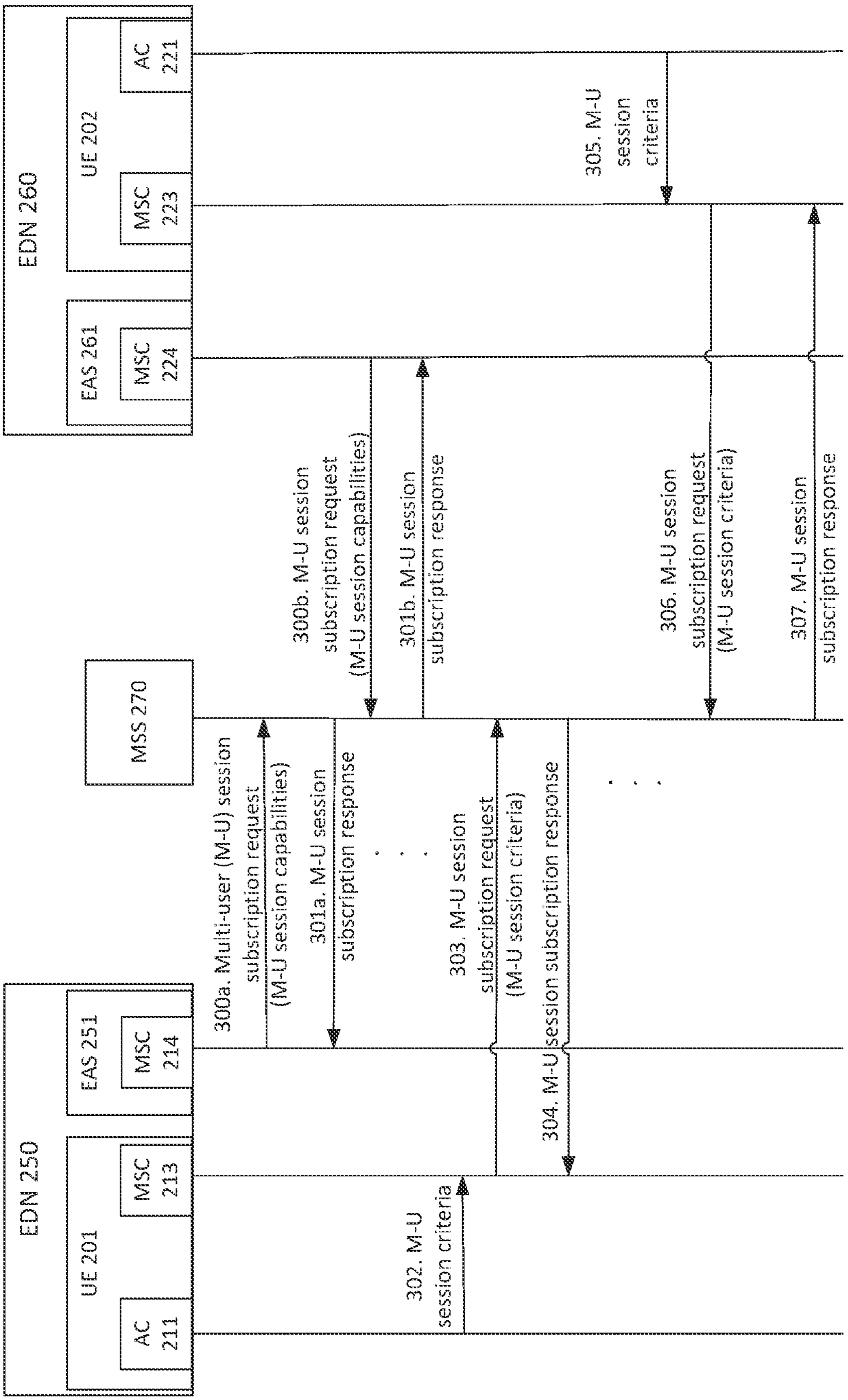
FIG. 5A illustrates an example of edge-based multi-user session establishment.
Figure 5B:
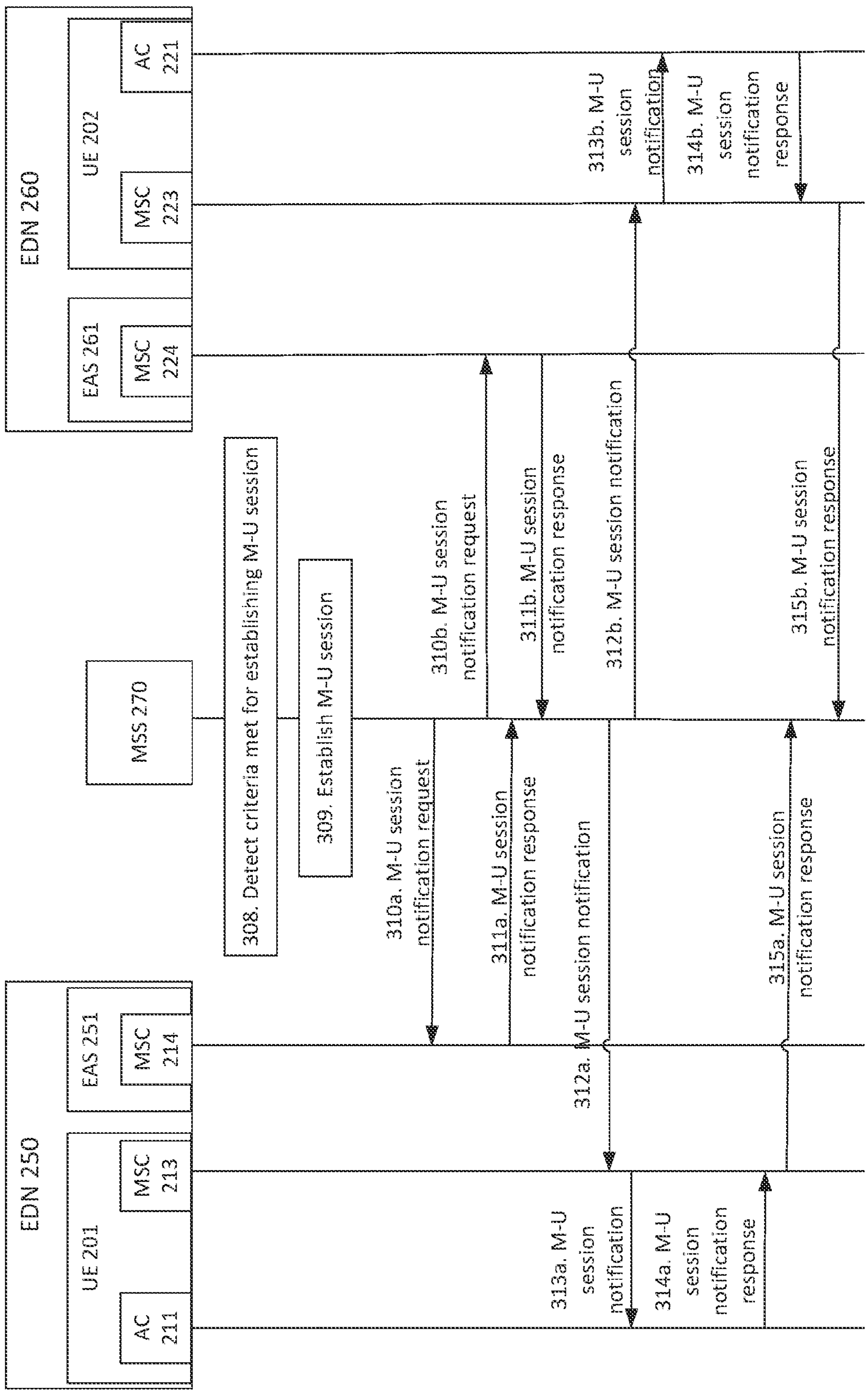
FIG. 5B illustrates an example of edge-based multi-user session establishment continued from FIG. 5A.
Figure 6A:
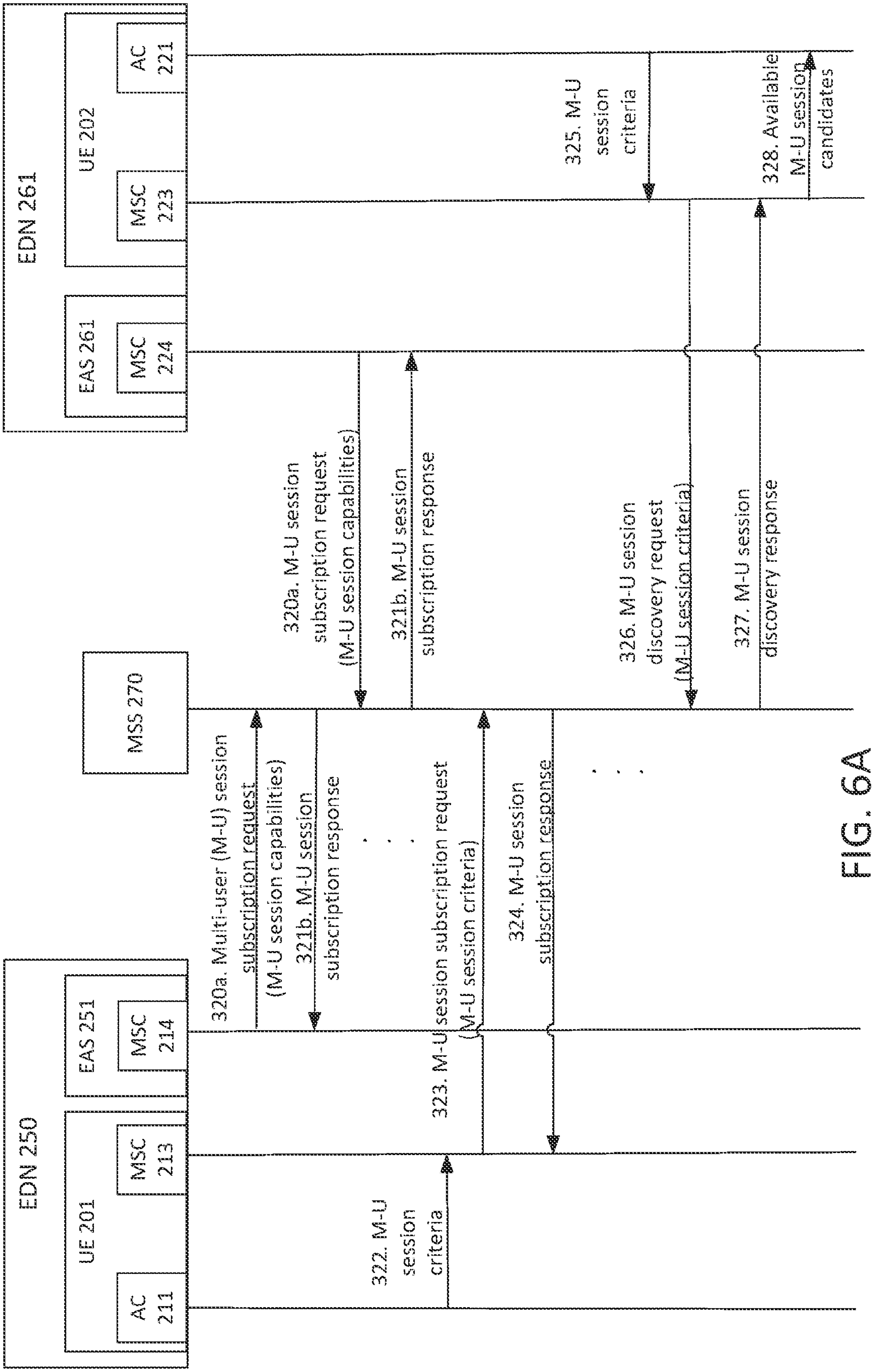
FIG. 6A illustrates an example of edge-based multi-user session establishment.
Figure 6B:
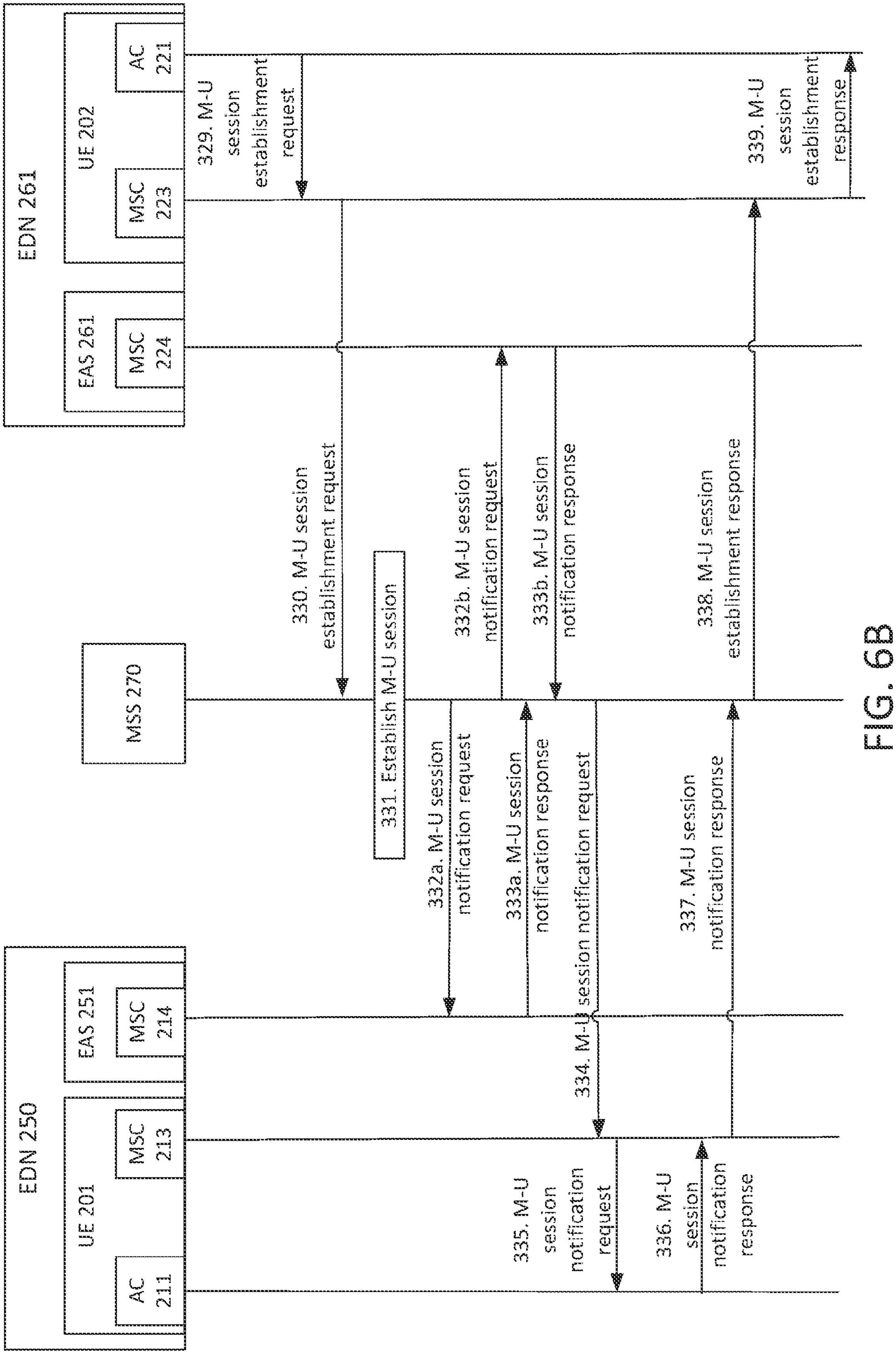
FIG. 6B illustrates an example of edge-based multi-user session establishment continued from FIG. 6A.

As shown in FIG. 3, a requesting entity (e.g., EEC 212, EES 252, ECS 253, EAS 251) may function as a multi-user session client (MSC) 213. FIG. 4 illustrates multi-user session lifecycle operations. As shown in FIG. 4, a MSC 213 may initiate one or more multi-user session lifecycle operation requests to a multi-user session server (MSS) 270. MSC 213 may receive input from users in the system that trigger MSC 213 to initiate multi-user session lifecycle requests to MSS 270. The requests may be issued in the sequence shown or the operations may be performed in different sequences than is shown in FIG. 4.

Step 281 of FIG. 4: To establish or modify a multi-user session between ACs (e.g., AC 211 and AC 221) interacting with one another via different EASs (e.g., EAS 251 and EAS 261), MSS 270 may receive request(s) from MSC(s) (e.g., MSC 213 or MSC 223). For example, one or more users (e.g., UE 201 or UE 202) may express interest (e.g., send a message) in joining or leaving a multi-user session (e.g., multi-user game). The request may include one or more informational elements, such as those defined in Table 1. Upon receiving the request, MSS 270 may authenticate MSC 213 or check whether the MSC 213 is authorized to perform the requested multi-user session operation. If authorized, MSS 270 may process the request by checking whether a multi-user session already exists that matches the information elements provided in the request. If a matching multi-user session does not exist, then MSS 270 may establish a new multi-user session by assigning a multi-user session ID and storing the multi-user session ID along with the information elements from the request. If a matching multi-user session already exists, MSS 270 may modify the session to add the information of any new participants (e.g., UE ID, AC ID, EAS ID, EAS address, EES ID, or EDN ID) defined in the request that are not already participants. Similarly, MSS 270 may remove the information of participants who request to be removed from the multi-user session.

TABLE 1

Multi-user Session Request Information Elements

| Information Element | Description |
|---|---|
| UE ID(s) or group ID | Identifier(s) of UE(s) hosting AC(s) participating in multi-user session. Alternatively, a group ID may be pre-provisioned to the participating UEs. |

TABLE 1-continued

| Multi-user Session Request Information Elements | |
|---|---|
| Information Element | Description |
| UE characteristics | One or more characteristics of the UEs participating in the multi-user session or that are candidates to participate:<br>UE location<br>UE type, e.g., constrained UE, etc.<br>PLMN the UEs are registered to<br>UE capabilities |
| AC characteristics | One or more characteristics of AC(s) participating in the multi-user session or that are candidates to participate<br>Identity of the AC.<br>Category or type of AC (e.g., V2X).<br>Preferred Edge Service Provider<br>Expected operation schedule of the AC (e.g., time windows)<br>Expected location(s) (e.g., route) of the hosting UE during the AC's operation schedule. -<br>Indication if service continuity support is required or not |
| EAS characteristics | One or more characteristics of the EAS(s) participating in the multi-user session or that are candidates to participate may include:<br>Identifier(s) of EAS(s)<br>Identifier of the required EAS provider<br>The category or type of required EAS (e.g., V2X)<br>Required availability schedule of the EAS (e.g., time windows)<br>Location(s) (e.g., geographical area, route) where the EAS service should be available.<br>Topological area (e.g., cell ID, TAI) for which the EAS service should be available.<br>Indication if service continuity support is required or not.<br>Required level of service permissions e.g., trial, gold-class<br>Required service features e.g., single vs. multi-player gaming service<br>Indication if multi-user sessions are supported |
| Multi-user session KPIs | One or more KPIs that may be required by multi-user session participants may include:<br>Application data synchronization frequency/rate required between EASs in the multi-user session<br>Application data synchronization latency between EASs in the multi-user session<br>Connection bandwidth required between EASs in the multi-user session<br>Connection bandwidth required between each AC and EAS in the multi-user session<br>Request rate required between EASs in the multi-user session<br>Request rate required between each AC and EAS in the multi-user session<br>Response time required from EASs in the multi-user session<br>Response time required from each EAS servicing an AC in the multi-user session<br>Percentage of time multi-user session EASs are required to be available<br>Compute resources required by each EAS servicing an AC in the multi-user session<br>Graphical compute resources required by each EAS servicing an AC in the multi-user session<br>Memory resources required by each EAS servicing an AC in the multi-user session<br>Storage resources required by each EAS servicing an AC in the multi-user session<br>End-to-end connection bandwidth required between multi-user session ACs communicating with one another through different EASs.<br>End-to-end request rate required between multi-user session ACs communicating with one another through different EASs |
| EES ID(s) | Identifier(s) of EES(s) participating in multi-user session |
| EDN(s) | Identifier(s) of EDNS(s) where the UE(s) hosting AC(s) participating in multi-user session are located |
| Multi-user session ID(s) | Identifier(s) of multi-user session(s) |
| Notification information | Information needed by the MSS to trigger and send notifications to a MSC based on events that are of interest to the MSC. Information<br>may include events of interest (e.g., invitations to join a multi-user session, multi-user session modifications, deletions, etc.) or address where to send notifications. |
| Criteria | One or more criteria or conditions that must be met for the MSS to perform the multi-user session request. For example, a scheduled time when to perform the request. |

TABLE 1-continued

Multi-user Session Request Information Elements

| Information Element | Description |
|---|---|
| Application data | Application specific information related to a multi-user session. For example, information exchanged between ACs or EASs during a multi-user game. |
| Network slice information | Network slice instance(s) or network slice type(s) associated with multi-user session. |
| QoS configuration | QoS configuration settings associated with multi-user session. |
| Application traffic configuration | Application traffic configuration settings (e.g., user plane latency requirement, schedule, location, routing requirements) associated with multi-user session. |
| Communication pattern configuration | Communication pattern configuration settings (e.g., scheduled communication time, traffic profile, or stationary indicator for UE or Group) associated with multi-user session. |
| Packet flow descriptor configuration | Packet flow descriptor configuration settings (e.g., IPFilterRule AVP for UE or Group) associated with multi-user session. |
| Network parameter configuration | Network parameter configuration settings (e.g., PSM or eDRX timers) associated with multi-user session. |
| Service specific parameter provisioning configuration | URSP service parameter configuration (e.g., urspInfluence, trafficDesc, routeSelParamSets) associated with multi-user session. |
| Service continuity settings | ACR scenario configuration associated with multi-user session. |
| Consensus indicator | A token indicating the consensus achieved among the session participants, e.g., all participants have agreed to establish/modify/tear-down a session. |

Each specific request may include one or more of the IEs detailed in Table 1. Note that although the term required is used herein, it is contemplated that requested may be appropriate replacement term herein. For example, there may be a request for a particular value (e.g., connection bandwidth), but not necessarily required. After receiving an incoming multi-user session lifecycle operation request the MSS may initiate one or more requests to other entities in the system to retrieve additional parameters. For example, the MSS 270 may discover the EES 262 serving a newly added session by using information about the associated AC 221 and EAS 261 in the incoming request. This information may be used in the subsequent steps. In another example, the MSC 213 may only include EAS identifiers in the EAS characteristics, and MSS 270 may perform EAS discovery to obtain the other information of the EASs.

While servicing an incoming request (e.g., from an MSC 213), MSS 270 may initiate one or more requests to other entities in the system, such as but not limited to, Group Management Server(s), network exposure function(s), OAM servers, or other MSS(s). The requests may include but are not limited to the types of requests defined in Table 2. The requests may include information elements such as one or more of the elements defined in Table 1. For each issued request to external entities, MSS 270 may also receive a response in return. The response may include results of the requested operation performed by the other entity.

Step 282: After processing of the request is complete, MSS 270 may return a response to MSC 213. If the processing is successful, the response may include a status indicating the multi-user session has been established or modified, a multi-user session ID, or a session expiration. The response may also include one or more information elements defined in Table 1. If the processing is not successful, the response may include information regarding the type of error encountered.

Step 283 of FIG. 4: To discover one or more existing multi-user sessions, a MSS 270 may receive a discovery request from an MSC 213. The request may include one or more discovery filter criteria. The discovery filter criteria may comprise one or more expressions. The expressions may comprise one or more parameters. The parameters may include informational elements such as those defined in Table 1. The expression may also include conditional statements that apply to the parameters. The conditional statements may comprise operators (e.g., =, !=, <, >, <=, >=) or values (e.g., numbers, strings). Upon receiving the request, the MSS 270 may authenticate the MSC 213 or check whether the MSC 213 is authorized to perform the requested multi-user session discovery request. If authorized, the MSS 270 processes the request by checking whether any multi-user sessions exist that matches the discovery filter criteria (if any) specified in the request.

Step 284 of FIG. 4: After processing of the discovery request is complete, the MSS 270 returns a response to the MSC 213. If one or more multi-user sessions are found to match the discovery filter criteria (if any) in the request, information regarding the matching multi-user sessions may be included in the response. This information may include one or more information elements defined in Table 1. If no matching multi-user sessions are found, the response may include empty results or an indication that no results were found.

Step 285 of FIG. 4: To subscribe to receive notifications for multi-user session events of interest, a MSS 270 may receive subscription requests from MSCs (e.g., MSC 213 or MSC 223). A subscription request may comprise one or more notification criteria comprising one or more elements. In one example, an element may indicate a type of multi-user session event of interest. For example, 'multi-user session changes' (e.g., changes in the ACs or EASs participating in the multi-user session, transitions of ACs to different EAS instances in different EDNs, changes in network resources allocated to multi-user session ACs and EASs, such as network slices, QoS, etc.). In another example, an element of the notification criteria may include an expression. The expression may comprise one or more parameters. The parameters may include informational elements such as those defined in Table 1. The expression may also include conditional statements that apply to the parameters. The conditional statements may comprise operators (e.g., =, !=, <, >, <=, >=) or values (e.g., numbers, strings). In yet another example, a subscription may be used by MSC 213 to express interest in joining an existing or prospective multi-user session meeting specified criteria (e.g., particular type of application, etc.). Upon receiving the request, MSS 270 may authenticate MSC 213 or check whether MSC 213 is authorized to perform the requested multi-user session subscription request. If authorized, MSC 213 processes the request by storing the subscription and monitoring the specified notification event criteria.

Step 286 of FIG. 4: After processing of the multi-user session subscription request, MSS 270 respond to MSC 213 including an indication whether the request was processed successfully or not. If successful, the response may also include a reference to the multi-user session subscription identifier stored by MSS 270 which may be used by MSC 213 to update or delete the subscription at a later time.

Step 287 of FIG. 4: When an event of interest as defined within the notification criteria of a multi-user session subscription is detected by MSS 270, MSS 270 may generate or send a multi-user session notification to MSC 213 (or another entity defined within the subscription). Within the notification, MSS 270 may include information, such as the type of multi-user session event that has occurred, a timestamp of the occurrence, the applicable multi-user session, or the applicable multi-user session subscription identifier. Additional information may also be provided, such as any applicable multi-user session participant information (e.g., IDs of the UEs, ACs, EASs, EESs, EDNs, or groups associated with the multi-user session), or other information elements defined in Table 1. In addition to sending the notification, MSS 270 may also initiate one or more operations, such as those specified in Table 2, upon detecting subscription notification criteria has been met. For the case where a subscription is used by MSC 213 to express interest in joining an existing or prospective multi-user session meeting MSC specified criteria (e.g., particular type of application, etc.), MSS 270 may send a notification to MSC 213. The notification may be sent when a multi-user session is created or detected by MSS 270 which matches the criteria specified by MSC 213 and MSC 213 is added as a member of the multi-user session. MSS 270 may also send notifications to MSC 213 for other types of events related to the multi-user session (e.g., MSC 213 is removed from the multi-user session or another MSC is added or removed to or from the multi-user session).

Step 288 of FIG. 4: After processing of the multi-user session notification, MSC 213 returns a response to MSS 270 including whether the notification was received or rejected. If MSS 270 receives a rejection response or fails to receive one or more responses to notifications that it sends to MSC 213, MSS 270 may cancel or delete a subscription such that no future notifications are generated. Alternatively, MSS 270 may buffer notifications rather than sending them to MSC 213.

Step 289 of FIG. 4: To tear-down a multi-user session between ACs (e.g., AC 211 or AC 221) interacting with one another via different EASs (e.g., EAS 251 or EAS 261), MSS 270 may receive a request from MSC 213. For example, one or more users may express interest in ending a multi-user session (e.g., multi-user game). The request may include one or more informational elements such as those defined in Table 1. Upon receiving the request, MSS 270 may authenticate MSC 213 or check whether MSC 213 is authorized to perform the requested tear-down of the multi-user session operation. If authorized, MSS 270 processes the request by checking whether a multi-user session exists that matches the information elements provided in the request. If a matching multi-user session does exist, then MSS 270 may tear down the multi-user session by deleting any session context. MSS 270 may also send one or more notifications regarding the tear-down (e.g., to the session participants). MSS 270 may also initiate one or more operations such as those specified in Table 2. Alternatively, MSS 270 may also initiate the tear-down of a multi-user session when MSS 270 detects that all or some participants (e.g., ACs) have left the multi-user session (e.g., are no longer members).

Step 290 of FIG. 4: After processing of the request is complete, MSS 270 returns a response to MSC 213. If the processing is successful, the response may include a status indicating the multi-user session has been torn down. The response may also include one or more information elements defined in Table 1. If the processing is not successful, the response may include information regarding the type of error encountered.

Edge-based Multi-user Session Establishment: FIG. 5A-FIG. 5B and FIGS. 6A-FIG. 6B provides examples showing how an edge-based multi-user session may be established leveraging the architectural enhancements to the EEL defined in FIG. 3 and the multi-user lifecycle operations defined in FIG. 4.

There may be leveraging MSC functionality, one or more EASs (e.g., EAS 251 or EAS 261) may send multi-user session subscription requests to MSS 270 (e.g., step 300*a* or step 300*b*). Within the requests, EAS characteristics may be included which may include multi-user session capabilities of EAS 251. EAS 251 may also include notification criteria and callback addresses such that the EAS 251 may be notified by MSS 270, (see step 301*a* or step 301*b*) when multi-user session operations (e.g., multi-user sessions established, modified, or torn down) involving the EASs are performed by MSS 270. After processing of the multi-user session subscription request, MSS 270 returns a response to the MSC of an EAS including an indication whether the request was processed successfully or not. If successful, the response may also include a reference to the multi-user session subscription identifier stored by MSS 270 which may be used by the MSC to update or delete the subscription at a later time.

At step 302, MSC 213 on UE 201 may receive a request from AC 211 on UE 201 with multi-user session information such as the types of information specified in Table 1.

At step 303, MSC 213 on UE 201 may send a multi-user session subscription request to MSS 270. Within the request, MSC 213 may include multi-user session information received from one or more ACs.

At step 304, After processing of the multi-user session subscription request, MSS 270 returns a response to MSC 213 of UE 201 including an indication whether the request was processed successfully or not. If successful, the response may also include a reference to the multi-user session subscription identifier stored by MSS 270 which may be used by MSC 213 to update or delete the subscription at a later time.

At step 305, MSC 223 on UE 202 may receive a request from AC 221 on UE 202 with multi-user session information such as the types of information specified in Table 1.

At step 306, MSC 223 on UE 202 may send a multi-user session subscription request to MSS 270. Within the request, MSC 223 may include multi-user session information received from one or more ACs.

At step 307, after processing of the multi-user session subscription request, MSS 270 may return a response to MSC 223 of UE 202 including an indication whether the request was processed successfully or not. If successful, the response may also include a reference to the multi-user session subscription identifier stored by MSS 270 which may be used by MSC 223 to update or delete the subscription at a later time.

At step 308, MSS 270 may detect that multiple ACs are interested in participating in the same type of multi-user session. This determination may be made using the information provided in each of the subscription requests received from the MSCs (e.g., MSC 213 or MSC 223) of each UE hosting the ACs (e.g., AC 211 and AC 221 in this example). For example, MSS 270 may detect that the ACs are of the same type or require the same type of EAS. MSS 270 may also detect that the ACs have the same operation schedule or have the same multi-user session KPI requirements.

At step 309, Based on this determination, MSS 270 may establish a multi-user session for the multiple ACs. MSS 270 may also determine one or more EASs to provide multi-user session services to the ACs. The determination of EASs may be made using information provided in each of the subscription requests received from the MSCs of each EAS. For example, MSS 270 may detect that the EASs are capable of supporting multi-user sessions and are of the same type needed by the ACs. MSS 270 may also detect that the EASs are able to support the multi-user session KPIs, which may be required by the ACs.

At step 310, after establishing the multi-user session, MSS 270 may send one or more notifications (e.g., step 310*a* or step 310*b*) to the applicable MSCs (e.g., MSC 214 or MSC 224) of the EASs. The MSS may include an indication that a multi-user session has been established and include information such as one or more information elements defined in Table 1.

At step 311, upon receiving a multi-user session notification, an EAS (e.g., EAS 251 or EAS 261) may process the notification to determine a multi-user session has been established and that the EAS 251 has been designated as an EAS 251 to provide services to one or more of the multi-user session ACs (e.g., AC 211 or AC 221). EAS may provide a response back to MSS 270 (e.g., step 311*a* or step 311*b*). The response may include an indication of whether the EAS agrees to provide services to the multi-user session ACs.

At step 312, after establishing the multi-user session, MSS 270 may send one or more notifications (e.g., step 312*a* or step 312*b*) to the applicable MSCs (e.g., MSC 214 or MSC 224) of the ACs (e.g., AC 211 or AC 221). MSS 270 may include an indication that a multi-user session has been established and include information such as one or more information elements defined in Table 1.

At step 313, MSC (e.g., MSC 214 or MSC 224) may in turn send a notification to one or more ACs (e.g., AC 211 or AC 221) on the UE (e.g., UE 201 or UE 202) indicating a multi-user session has been established and include information such as one or more information elements defined in Table 1.

At step 314, upon receiving a multi-user session notification, an AC may process the notification to determine a multi-user session has been established for the AC. The AC may provide a response back (e.g., step 314*a* or step 314*b*) to the MSC (e.g., MSC 214 or MSC 224). The response may include an indication of whether the AC agrees to participate in the multi-user session.

At step 315, MSC may forward (e.g., step 315*a* or step 315*b*) the response back to MSS 270. Based on the received notification responses, MSS 270 may determine whether all or some ACs and EASs agree to participate in the multi-user session. If one or more ACs or EASs do not agree, then MSS 270 may perform one or more actions such as tearing-down the multi-user session, notifying ACs and EASs the multi-user session has been tom down, establishing a new multi-user session between the same or different ACs or EASs.

Step 320 and step 321 are similar to step 300 and step 301.

Step 322 is similar to step 302.

Step 323 is similar to step 303.

Step 324 is similar to step 304.

At step 325, MSC 223 on UE 202 may receive a request from AC 221 on UE 202 to discover multi-user sessions that meet one or more specified criteria. The criteria may include information such as the types of information specified in Table 1.

At step 326, MSC 223 on UE 202 may send a multi-user session discovery request to MSS 270. Within the request, MSC 223 may include multi-user session discovery criteria received from one or more ACs.

At step 327, After receiving the multi-user session discovery request, MSS 270 may process it by checking whether there are any existing multi-user sessions that meet the specified criteria defined in the request. Alternatively, MSS 270 may check whether there are any other ACs interested in joining a multi-user session of a similar type specified in the request. MSS 270 may respond back to MSC 223. In the response, MSC 223 may include one or more multi-user sessions that have already been established and that meet the discovery criteria. Alternatively, MSS 270 may respond back with one or more ACs that are interested in joining a multi-user session meeting the criteria specified in the request.

At step 328, MSC 223 may forward the multi-user session discovery results to AC 221.

At step 329, MSC 223 may receive a request from AC 221 for establishing or updating a multi-user session for AC 221. The request may include information regarding a discovered existing multi-user session or prospective multi-user session participants (e.g., ACs). The request may also include additional information elements such as those specified in Table 1.

At step 330, MSC 223 may forward the request to MSS 270 for processing.

At step 331, MSS 270 may establish a multi-user session based on the information received in the request.

Step 332*a* or step 332*b* is similar to step 310*a* or 310*b*.

Step 333*a* or step 333*b* is similar to step 311*a* or 311*b*.

Step 334 is similar to step 312*a* or 312*b*.

Step 335 is similar to step 313*a* or 313*b*.

Step 336 is similar to step 314*a* or 314*b*.

Step 337 is similar to step 315*a* or 315*b*.

At step 338, upon receiving a multi-user session notification, MSS 270 may process the notifications to determine if the multi-user session has been established for all or some of the participating ACs or EASs. MSS 270 may provide a multi-user session establishment or update response back to MSC 223 with the result.

At step 339, MSC 223 may forward the response back to AC 221.

Edge-based Multi-user Session Aware Operations: Once a multi-user session (spanning across multiple EAS instances supporting the same type of service from the same ASP but deployed in different EDNs) has been established, the multi-user session ACs may then initiate interaction with one another. This interaction takes place via the EASs located within each of the respective EDNs in which the UEs of the multi-user session ACs reside in.

Figure 7:
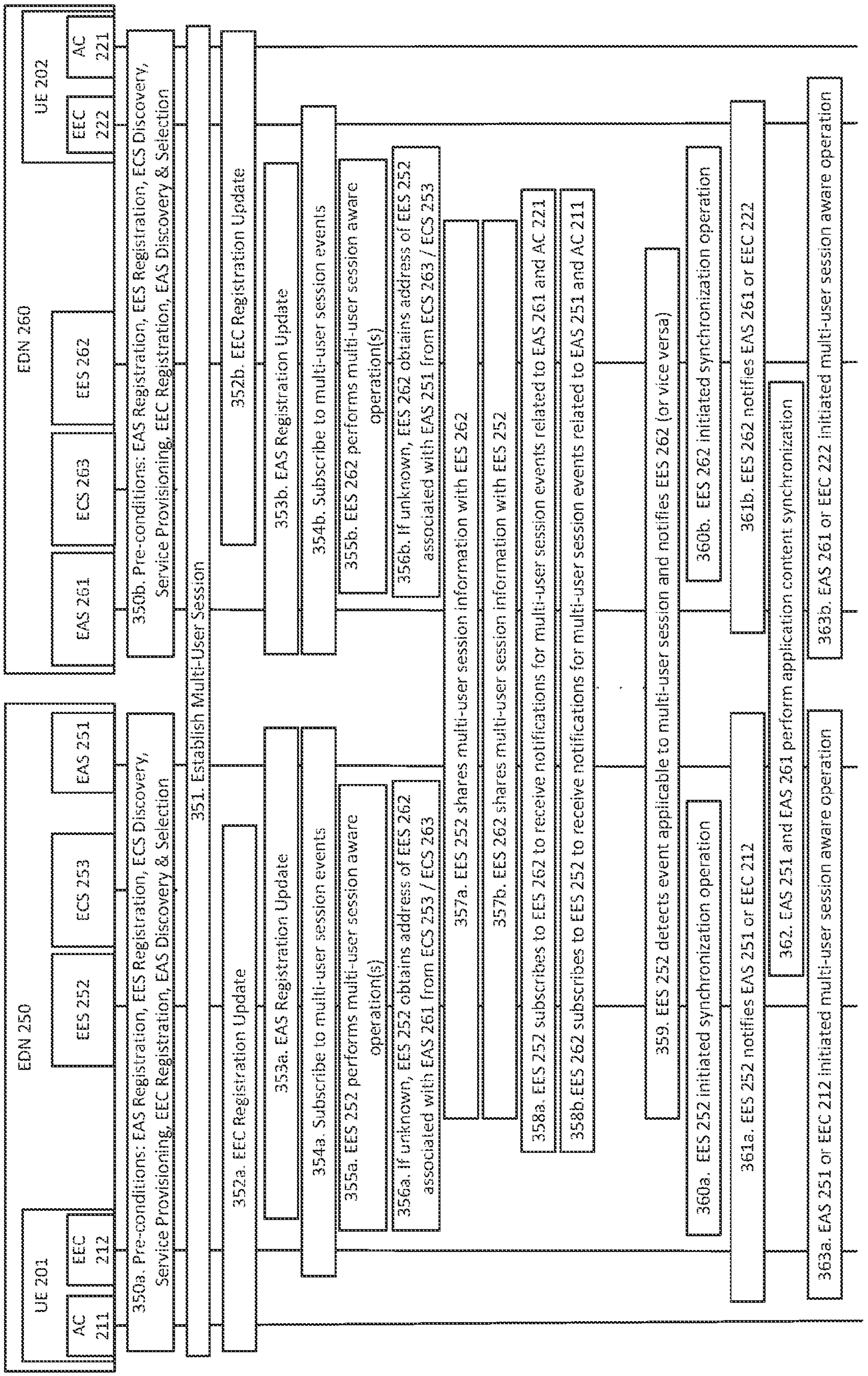
FIG. 7 illustrates an example of edge-based multi-user session aware operations.

Before, during, or after this multi-user session interaction, various types of edge-based multi-user session aware operations may be performed as shown in FIG. 7. These operations may take place within the individual EDNs of the session participants as well as across the EDNs such that synchronization of EEL and network resources assigned to the multi-user session participants takes place in a consistent and aligned manner. These operations may help ensure the interaction between the multi-user session ACs occurs in a seamless fashion and that the KPIs defined for the multi-user session are met for all the users.

Note, the entities (e.g., ACs, EECs, EESs, EASs) defined in this procedure may perform one or more of these multi-user session aware operations in the sequence shown or in different sequences than is shown in FIG. 7.

At step 350*a* or step 350*b* pre-conditions may occur: Per the edge application enabler layer (EEL) procedures defined by the 3GPP SA6, EASs register to EESs, EESs register to ECSs, EECs discover ECSs, EECs are provisioned by ECSs with assigned EESs, EECs register to EESs and discover and EASs, or ACs select EASs to interact with. These operations may take place in each of the EDNs.

Step 351 of FIG. 7: A multi-user session may be established. In one example, the multi-user session may be established via the architectural enhancements to the EEL defined in FIG. 3 and the corresponding procedures involving operations between MSC(s) (e.g., MSC 213 or MSC 223) or MSS 270 defined in FIG. 4. In another example, the multi-user session may be established in an application specific manner. In yet another example, the multi-user sessions may be pre-configured or pre-provisioned within the entities in the system.

Step 352*a* or step 352*b* of FIG. 7: When a multi-user session has been established, one or more ACs (e.g., AC 211 or AC 221) participating in a multi-user session may share multi-user session information with the EEC hosted on the same UE (e.g., UE 201 or UE 202) as the AC. This information may include the multi-user session information defined in Table 1. The sharing of this information may be initiated by an AC when multi-user session operations, such as establishment, modification, or tear-down of multi-user sessions occur. For example, when AC 211 initiates a multi-user session request or receives a multi-user session notification. Upon receiving multi-user session information from AC(s) 211, an EEC 212 may share this information with one or more ECSs (e.g., ECS 253 or ECS 263) or EESs (e.g., EES 252 or EES 262). For example, an ECS 253 or EES 252 in the same EDN 250 in which the EEC 212 currently resides in. In one example, this information may be shared with an ECS 253 when EEC 212 performs service provisioning request with ECS 253. In another example, this information may be shared with an EES 252 when EEC 212 performs an EEC registration request to EES 252. In another example, EEC 212 may share this information via another type of request or a dedicated multi-user session request that it sends to ECS 253 or EES 252. Upon receiving multi-user session information from EEC 212, ECS 253 or EES 252 may store this information such that ECS 253 or EES 252 may use it to perform subsequent operations in a multi-user session aware fashion.

Step 353*a* or step 353*b* of FIG. 7: Similarly, once a multi-user session has been established, one or more EASs participating in a multi-user session may share multi-user session information with one or more EESs (e.g., EES 252 or EES 262). For example, EAS 251 may share multi-user session information with the EES they are registered to in their respective EDN. This information may include the multi-user session information defined in Table 1. The sharing of this information may be initiated by EAS 251 when multi-user session operations such as establishment, modification, or tear-down of multi-user sessions occur. For example, when EAS 251 initiates a multi-user session request or receives a multi-user session notification. In one example, this information may be shared by EAS 251 performing an EAS registration request or a registration update request to EES 252. In another example, EAS 251 may share this information via another type of request or a dedicated multi-user session request that it sends to EES 252. Upon receiving multi-user session information from EAS 251, EES 252 may share this information with other entities in the EEL such as one or more ECSs, EECs, or other EESs or EASs. EES 252 may also store multi-user session information such that the EES 252 may use it to perform subsequent operations in a multi-user session aware fashion.

Step 354*a* or step 354*b* of FIG. 7: EAS(s) 251 or EEC(s) 212 that are actively participating in a multi-user session or that are capable of participating in multi-user sessions may subscribe to EES(s) 252 to receive multi-user session related notifications. To subscribe, EAS 251 or EEC 212 may issue a subscription request to the EES 252 that includes notification criteria specifying a multi-user session ID or multi-user session event of interest (e.g., multi-user session establishment, modification, or tear down related events, AC added, AC removed, EAS added, EAS removed, etc.). Upon receiving a multi-user session subscription request from an EAS 251 or EEC 212, EES 252 may start monitoring for the occurrence of multi-user session related events defined within the subscription. EES 252 may in turn subscribe to other entity(s) in the system to assist it with detecting multi-user session events. For example, EES 252 may support MSC functionality for sending a multi-user session subscription request to an MSS and receiving multi-user session notifications from MSS 270. The subscription request that the EES 252 sends may include a multi-user session ID or a multi-user session event of interest events that that EES 252 receives from EAS 251 or EEC 212.

Step 355*a* or step 355*b* of FIG. 7: when EES 252 becomes aware of a multi-user session via interaction with EEC 212 as defined in Step 352 of FIG. 7, via interaction with an EAS 251 as defined in Step 353 of FIG. 7, or via one or more MSS operations defined in FIG. 4 (e.g., EES supports MSC functionality or MSS functionality), EES 252 may initiate one or more multi-user session aware operations, such as, but not limited to, the operations defined in Table 2.

If one or more of the multi-user session aware operations performed by EES 252 are unsuccessful or the outcome does not meet the requirements of the multi-user session, EES 252 (supporting MSC functionality or MSS functionality) may trigger a multi-user session modify request.

For example, EES 252 may find that the communication pattens of one AC 211 differs from the other ACs in the same multi-user session (e.g., cannot be synchronized). In this case EES 252 may decide to remove AC 211 from the multi-user session or be added to another multi-user session which is a better fit.

In another example, if EES 252 cannot achieve the proper synchronization between all or some ACs or EASs participating in a multi-user session, the EES may initiate a request to replace the EAS 251 (e.g., trigger an ACR).

TABLE 2

Multi-user Session Aware Operations

| Operation | Description |
|---|---|
| configuration of network slices | Send one or more requests to network slice management functions in the system (e.g., NSCE server, OAM server, NSSF or in 5G CN) to configure the assignment (e.g., synchronize) of network slice types or instances used by each of the multi-user session ACs for communication with their respective multi-user session EASs.<br>Subscribe to network slice configuration or management entities in the system to monitor and receive notifications regarding network slice events applicable to multi-user session participants. For example, when changes to network slices allocated to one or more multi-user participants occur. Upon receiving notifications of these events, perform one or more operations (e.g., align network slices used by the multi-user session participants). |
| configuration of session QoS configurations | Send one or more requests to session QoS configuration functions in the system (e.g., SCEF, NEF) to configure (e.g., synchronize) the session QoS configuration settings (e.g., latency, jitter, priority handling of the IP flows) used for network communication between the multi-user session ACs and their respective multi-user session EASs.<br>Subscribe to QoS configuration functions in the system to monitor and receive notifications regarding QoS related events applicable to multi-user session participants. For example, when changes to QoS session configurations to one or more multi-user participants occur. Upon receiving notifications of these events, perform one or more operations (e.g., align QoS session configurations of the multi-user session participants). |
| configuration of application traffic configurations | Send one or more requests to application traffic configuration management functions in the system (e.g., SCEF, NEF) to configure (e.g., synchronize) the application traffic configuration settings (e.g., user plane latency requirement, schedule, location, routing requirements) and influence the routing of user plane traffic across the multi-user session ACs and their respective multi-user session EASs.<br>Subscribe to application traffic configuration management functions in the system to monitor and receive notifications regarding application traffic related events applicable to multi-user session participants. For example, when changes to application traffic configuration to one or more multi-user participants occur. Upon receiving notifications of these events, perform one or more operations (e.g., align application traffic configurations of the multi-user session participants).<br>In doing so, routes (e.g., which UPFs) used between the multi-user session ACs and EASs can be aligned to use same/similar routes. This can help ensure the network KPIs (e.g., latency, jitter) are consistent for the different AC/EAS pairs of the multi-user session. |
| configuration of communication pattern configurations | Based on input received from EASs or ACs participating in a multi-user session, send one or more requests to communication pattern configuration management functions in the system (e.g., SCEF, NEF) to configure (e.g., synchronize) the communication pattern configuration settings (e.g., scheduled communication time, traffic profile, periodicity, stationary indicator for UE or Group) across the multi-user session ACs and their respective multi-user session EASs.<br>Subscribe to communication pattern configuration management functions in the system to monitor and receive notifications regarding communication pattern related events applicable to multi-user session participants. For example, when changes to communication pattern configuration to one or more multi-user participants occur. Upon receiving notifications of these events, perform one or more operations (e.g., align communication pattern configurations of the multi-user session participants). |
| configuration of packet flow descriptor configurations | Based on input received from EASs or ACs participating in a multi-user session, send one or more requests to packet flow descriptor configuration management functions in the system (e.g., SCEF, NEF) to configure (e.g., synchronize) the packet flow descriptor configuration settings (e.g., IPFilterRule AVP for UE or Group) across the multi-user session ACs and their respective multi-user session EASs.<br>Subscribe to packet flow descriptor configuration management functions in the system to monitor and receive notifications regarding packet flow descriptor related events applicable to multi- |

TABLE 2-continued

Multi-user Session Aware Operations

| Operation | Description |
|---|---|
| | user session participants. For example, when changes to packet flow descriptor configuration to one or more multi-user participants occur. Upon receiving notifications of these events, perform one or more operations (e.g., align packet flow descriptor configurations of the multi-user session participants). |
| configuration of network parameter configurations | Based on input received from EASs or ACs participating in a multi-user session, send one or more requests to network parameter configuration management functions in the system (e.g., SCEF, NEF) to configure (e.g., synchronize) the network parameter configuration settings (e.g., Maximum Latency, Maximum Response Time, and Suggested Number of Downlink Packets) across the multi-user session ACs and their respective multi-user session EASs. Subscribe to network parameter configuration management functions in the system to monitor and receive notifications regarding network parameter related events applicable to multi-user session participants. For example, when changes to network parameter configuration to one or more multi-user participants occur. Upon receiving notifications of these events, perform one or more operations (e.g., align network parameter configurations of the multi-user session participants). In doing so, synchronization of the network parameters can ensure that the UEs hosting the ACs participating in the multi-user session have PSM and eDRX timers that are aligned with one another. This can help minimize and reduce end-to-end communication latency between these ACs/UEs. |
| configuration of groups | Send one or more requests to group management functions in the system (e.g., SCEF, NEF, group management server) to query, create, modify, or terminate a group for multi-user session participants. Send request(s) to one or more multi-user session EASs to configure (e.g., synchronize) group information (e.g., group identifiers, group members) across the EASs. |
| Dynamic EAS Instantiation Synchronization | Send one or more requests to an EAS management function in the system to trigger the EAS management function to dynamically instantiate EASs for use in a multi-user session. In doing so, the EASs may be configured and instantiated in a synchronized fashion such that their configurations, settings, and allocated resources are synchronized with one another, and the EASs are equipped to provide services with comparable KPIs to multi-user session ACs. For example, new EAS instances may be instantiated within the locations (e.g., different EDNs) of the different multi-user session ACs. |
| configuration of service specific parameter provisioning | Based on input received from EASs or ACs participating in a multi-user session, send one or more Service Specific Parameter Provisioning requests to a network exposure function (e.g., NEF) to configure (e.g., synchronize) URSP service parameter configuration (e.g., urspInfluence, trafficDesc, or routeSelParamSets) across the multi-user session ACs and their respective multi-user session EASs. |
| configuration of service continuity settings | Align the ACR scenarios that are used across the ACs, EECS, EESs, or EASs of a multi-user session such that the same type of ACR is used across the multi-user session ACs and their respective multi-user session EASs. |
| synchronization of application data | Send one or more requests to EASs associated with a multi-user session to trigger the EASs to synchronize (e.g., share) application data with one another for the multi-user session ACs they each service. |

Step 356*a* or step 356*b* of FIG. 7: EES 252 may interwork with other EESs in the system to ensure the configuration of settings within the underlying network and EEL are synchronized and consistent across each of the multi-user session ACs and EASs (e.g., in the different EDNs). If the identifier or address of other EESs is not known, an EES may obtain it from an ECS in its local EDN or ECS(s) in other EDNs. In one example, an EES may issue a discovery request to ECS(s) to query and find EES(s) to which other EASs of a specified multi-user session have registered to. The discovery request may include multi-user session information such as any of the information elements defined in Table 1.

Step 357*a* or step 357*b* of FIG. 7: EESs may share multi-user session information with one another such as the information elements defined in Table 1. This sharing may occur by EESs either pushing or pulling multi-user session information between themselves. By sharing this information, EESs can synchronize the multi-user session aware operations they perform such as the operations defined in Table 2. For each of the operations performed, the EESs can align their settings (e.g., network slices, QoS, application traffic, communication patterns, packet flow descriptors, network parameters, service specific parameters, service continuity settings, etc.). Doing so can help ensure each of the ACs in a multi-user session experience the same KPIs/KQIs (e.g., data rate, latency, jitter, reliability) when interacting with their respective EASs and the end-to-end interaction between the multi-user session users results in a good QoE.

Step 358*a* or step 358*b* of FIG. 7: EESs may subscribe to one another to receive notifications regarding multi-user session events. Example notifications may include (e.g., ACRs, NS management operations, QoS Session updates) A subscription request may include notification criteria specifying a multi-user session ID or multi-user session event of interest. Multi-user session events may include multi-user session lifecycle events (e.g., establishment, modification or tear-down of a multi-user session) or events related to changes in underlying network or EEL resources allocated to multi-user sessions. For example, changes in network slices, QoS session configuration, application traffic configuration, communication patterns, packet flow descriptors, network parameters, service specific parameters, or service continuity settings for a multi-user session. Upon receiving a multi-user session subscription request from an another EES, the EES may start monitoring for the occurrence of multi-user session related events defined within the subscription. The EES may in turn subscribe to other entity(s) in the system to assist it with detecting multi-user session events. For example, the EES may support MSC functionality for sending a multi-user session subscription request to an MSS and receiving multi-user session notifications from the MSS. The subscription request that the ESS sends to another entity may include a multi-user session ID or a multi-user session event of interest events that that the EES receives from the other EES(s).

Step 359 of FIG. 7: when an EES detects a multi-user session event or receives a multi-user session notification (e.g., from an MSS), the EES may in turn generate and send a corresponding multi-user session notification to other EESs that subscribed to it. Within the notification, the EES may include information such as the type of multi-user session event that has occurred. The EES may also specify one or more operations that the other EES(s) should perform in response to the event. For example, the EES may request that the other EES(s) initiate updates to the network slices, QoS session configuration, application traffic configuration, communication patterns, packet flow descriptors, network parameters, service specific parameters, or service continuity settings for a multi-user session. The EES may also include configuration or parameter settings within the notification that the other EAS(s) may use when performing these operations (e.g., network slice settings, QoS session configuration settings, etc.)

Step 360*a* or step 360*b* of FIG. 7: Upon receiving a notification from another EES of a multi-user session related event, the EES may perform one or more multi-user session operations such as the operations defined in Table 2 (e.g., align traffic influence settings). When performing these operations, the EES may use configuration or parameter settings contained within the notification. In doing so, the configuration of these network and EEL resources can be aligned and synchronized across the EES and EDNs of the multi-user session participants.

Step 361*a* or step 361*b* of FIG. 7: when the EES detects a multi-user session event or receives a multi-user session notification (e.g., from another EES or an MSS), the EES may in turn generate and send a corresponding multi-user session notification to one or more EASs or EECs (e.g., for EASs or EECs that have subscribed to receive multi-user session events from the EES). Within the notification, the EES may include information such as the type of multi-user session event that has occurred. The EES may also specify one or more actions that the EAS or EEC should perform in response to the event. For example, the EES may request that the EAS synchronize application data with one or more other EASs being used by multi-user session ACs.

Step 362 of FIG. 7: EASs perform application data synchronization by exchanging application data with one another (e.g., multi-player gaming data).

Step 363*a* or step 363*b* of FIG. 7: EASs or EECs may initiate multi-user session aware operations such as the operations defined in Table 2 (e.g., Trigger NS adaptation via NSCE, Configure Session QoS via NEF, etc.). To initiate these operations an EAS or EEC may send a request to an EES to trigger the EES to perform the operation. Alternatively, an EAS or EEC may initiate the operation directly with other functions in the system (e.g., NEF or MSS).

Graphical User Interface

Figure 8:
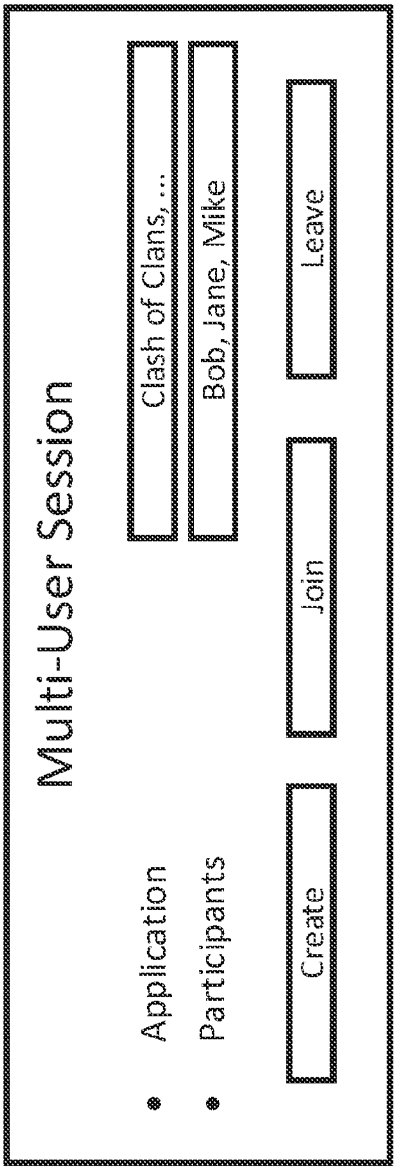
FIG. 8 illustrates an exemplary graphics user interface (GUI)

Users may trigger multi-user session operations such as establishing, modifying, or tearing-down a multi-user session. For example, a multi-user gaming session or a multi-user extended reality experience. FIG. 8 shows an example GUI in which a user may initiate multi-user session operations. For example, users may discover multi-user sessions that have already been established. Users may join an already active multi-user session. Users may establish a new multi-user session. Users may leave a multi-user session.

It is understood that the entities performing the steps illustrated herein, such as FIG. 3-FIG. 8, may be logical entities. The steps may be stored in a memory of, and executing on a processor of, a device, server, or computer system such as those illustrated in FIG. 9F or FIG. 9G. Skipping steps, combining steps, or adding steps between exemplary methods disclosed herein (e.g., FIG. 3-FIG. 8) is contemplated.

TABLE 3

Abbreviations and Definitions

| Abbreviations | Definitions |
|---|---|
| 3GPP | Third Generation Partnership Project |
| 5GS | 5G System |
| AC | Application Client |
| ACR | Application Context Relocation |
| AF | Application Function |
| API | Application Programming Interface |
| AS | Application Server |
| ASP | Application Service Provider |
| AVP | Attribute Value Pair |
| CAS | Cloud Application Server |
| CN | Core Network |
| DNN | Data Network Name |
| EAS | Edge Application Server |
| EDN | Edge Data Network |
| EEC | Edge Enabler Client |
| EEL | Edge Enabler Layer |
| EES | Edge Enabler Server |
| ECS | Edge Configuration Server |
| GUI | Graphical User Interface |
| KPI | Key Performance Indicator |
| MNO | Mobile Network Operator |
| MSC | Multi-user Session Client |
| MSS | Multi-user Session Server |
| NEF | Network Exposure Function |
| NS | Network Slice |
| NSACF | Network Slice Access Control Function |
| NSCALE | Network Slice Capability Application Layer Exposure |
| NSCE | Network Slice Capability Exposure |
| NSI | Network Slice Instance |
| NSSAI | Network Slice Selection Assistance Information |
| OAM | Operations, Administration and Maintenance |
| PLMN | Public Land Mobile Network |

TABLE 3-continued

| Abbreviations and Definitions | |
|---|---|
| Abbreviations | Definitions |
| PSM | Power Savings Mode |
| QoE | Quality of Experience |
| QoS | Quality of Service |
| RAN | Radio Access Network |
| SCEF | Service Capability Exposure Function |
| SEAL | Service Enabler Architecture Layer for Verticals |
| UE | User Equipment |
| URSP | UE Route Selection Policy |
| VAL | Vertical Application Layer |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), Non-Terrestrial Networks (NTN), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 9A:
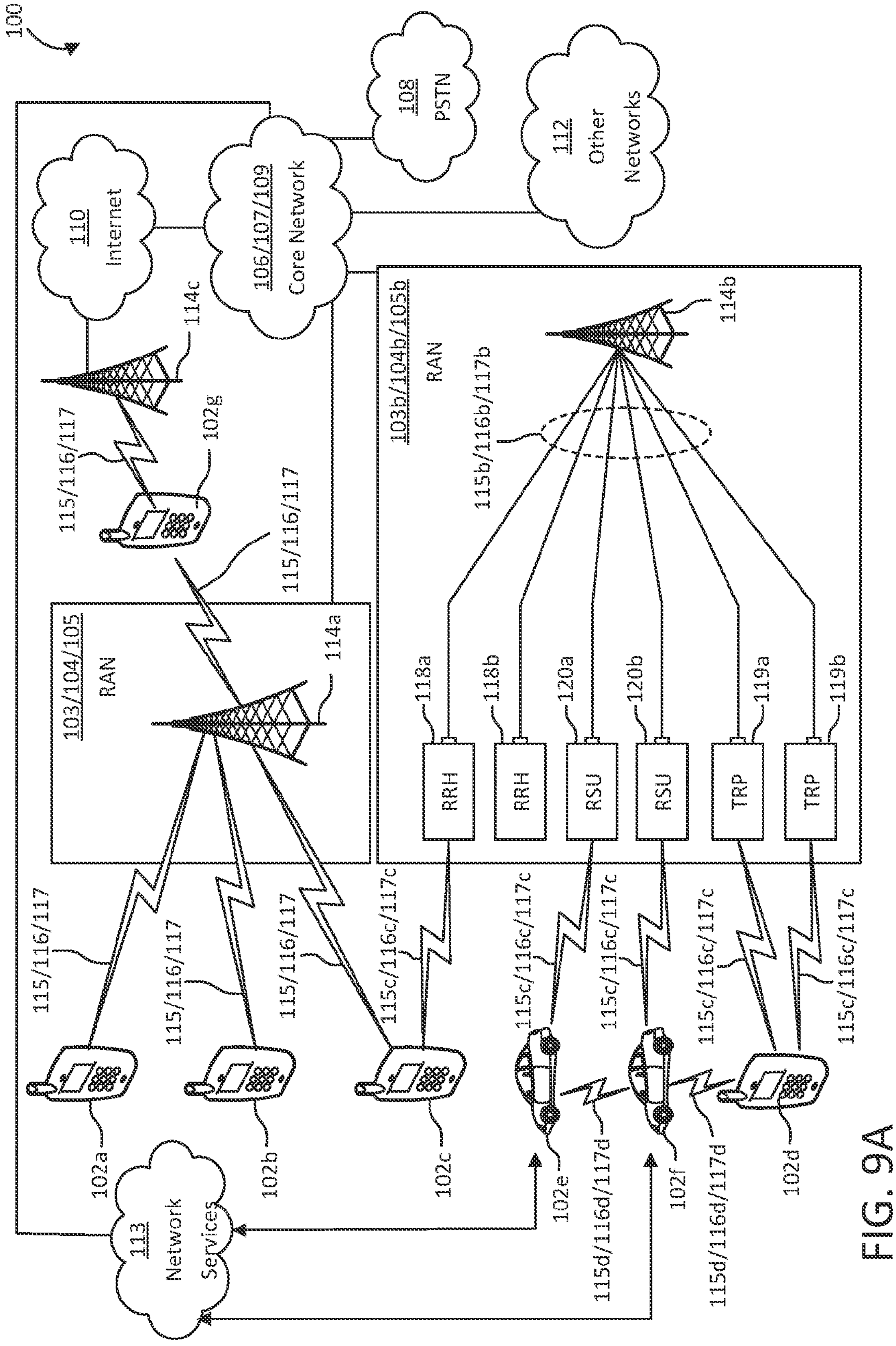
FIG. 9A illustrates an example communications system.

FIG. 9A illustrates an example communications system 100 in which the methods and apparatuses of multi-user sessions in edge data networks, such as the systems and methods illustrated in FIG. 3 through FIG. 8 described and claimed herein may be used. The communications system 100 may include wireless transmit/receive units (WTRUs) 102*a*, 102*b*, 102*c*, 102*d*, 102*e*, 102*f*, or 102*g* (which generally or collectively may be referred to as WTRU 102 or WTRUs 102). The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102*a*, 102*b*, 102*c*, 102*d*, 102*e*, 102*f*, or 102*g* may be any type of apparatus or device configured to operate or communicate in a wireless environment. Although each WTRU 102*a*, 102*b*, 102*c*, 102*d*, 102*e*, 102*f*, or 102*g* may be depicted in FIG. 9A, FIG. 9B, FIG. 9C, FIG. 9D, FIG. 9E, or FIG. 9F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114*a* and a base station 114*b*. In the example of FIG. 9A, each base stations 114*a* and 114*b* is depicted as a single element. In practice, the base stations 114*a* and 114*b* may include any number of interconnected base stations or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, or the other networks 112. Similarly, base station 114*b* may be any type of device configured to wiredly or wirelessly interface with at least one of the Remote Radio Heads (RRHs) 118*a*, 118*b*, Transmission and Reception Points (TRPs) 119*a*, 119*b*, or Roadside Units (RSUs) 120*a* and 120*b* to facilitate access to one or more communication networks, such as the core network 106/107/109, the Internet 110, other networks 112, or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, or other networks 112

TRPs 119*a*, 119*b* may be any type of device configured to wirelessly interface with at least one of the WTRU 102*d*, to facilitate access to one or more communication networks, such as the core network 106/107/109, the Internet 110, Network Services 113, or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations or network elements (not shown), such as a BSC, a RNC, relay nodes, etc. The base station 114*a* may be configured to transmit or receive wireless signals within a particular geographic region, which may be referred to as a cell (not shown). Similarly, the base station 114*b* may be configured to transmit or receive wired or wireless signals within a particular geographic region, which may be referred to as a cell (not shown) for methods, systems, and devices of multi-user sessions in edge data networks, as disclosed herein. Similarly, the base station 114*b* may be configured to transmit or receive wired or wireless signals within a particular geographic region, which may be referred to as a cell (not shown). The cell may further be divided into cell sectors. For example, the cell associated with the base station 114*a* may be divided into three sectors. Thus, in an example, the base station 114*a* may include three transceivers, e.g., one for each sector of the cell. In an example, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c*, or 102*g* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, or RSUs 120*a*, 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, or 102*f* may communicate with one another over an air interface 115*d*/116*d*/117*d*, such as Sidelink communication, which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMITS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114*a* and the WTRUs 102*a*, 102*b*, 102*c*, or RRHs 118*a*, 118*b*, TRPs 119*a*, 119*b*, or RSUs 120*a*, 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) or LTE-Advanced (LTE-A). In the future, the air interface 115/116/117 or 115*c*/116*c*/117*c* may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114*a* in the RAN 103/104/105 and the WTRUs 102*a*, 102*b*, 102*c*, and 102*g* or RRHs 118*a*, 118*b*, TRPs 119*a*, 119*b* or RSUs 120*a*, 120*b* in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 9A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of multi-user sessions in edge data networks, as disclosed herein. In an example, the base station 114*c* and the WTRUs 102, e.g., WTRU 102*e*, may implement a radio technology such as IEEE 802.11 to establish a wireless local area network (WLAN). similarly, the base station 114*c* and the WTRUs 102*d*, may implement a radio technology such as IEEE 802.15 to establish a wireless personal area network (WPAN). In yet another example, the base station 114*c* and the WTRUs 102, e.g., WTRU 102*e*, may utilize a cellular-based RAT (e.g., WCDMA, CDMA2000, GSM, LTE, LTE-A, NR, etc.) to establish a picocell or femtocell. As shown in FIG. 9A, the base station 114*c* may have a direct connection to the Internet 110. Thus, the base station 114*c* may not be required to access the Internet 110 via the core network 106/107/109.

The RAN 103/104/105 or RAN 103*b*/104*b*/105*b* may be in communication with the core network 106/107/109, which may be any type of network configured to provide voice, data, messaging, authorization and authentication, applications, or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 9A, it will be appreciated that the RAN 103/104/105 or RAN 103*b*/104*b*/105*b* or the core network 106/107/109 may be in direct or indirect communication with other RANs that employ the same RAT as the RAN 103/104/105 or RAN 103*b*/104*b*/105*b* or a different RAT. For example, in addition to being connected to the RAN 103/104/105 or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102*a*, 102*b*, 102*c*, 102*d*, 102*e* to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*. 102*e*, and 102*f* may include multiple transceivers for communicating with different wireless networks over different wireless links for implementing methods, systems, and devices of multi-user sessions in edge data networks, as disclosed herein. For example, the WTRU 102*g* shown in FIG. 9A may be configured to communicate with the base station 114*a*, which may employ a cellular-based radio technology, and with the base station 114*c*, which may employ an IEEE 802 radio technology.

Although not shown in FIG. 9A, it will be appreciated that a User Equipment may make a wired connection to a gateway. The gateway may be a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115*c*/116*c*/117*c* may equally apply to a wired connection.

Figure 9B:
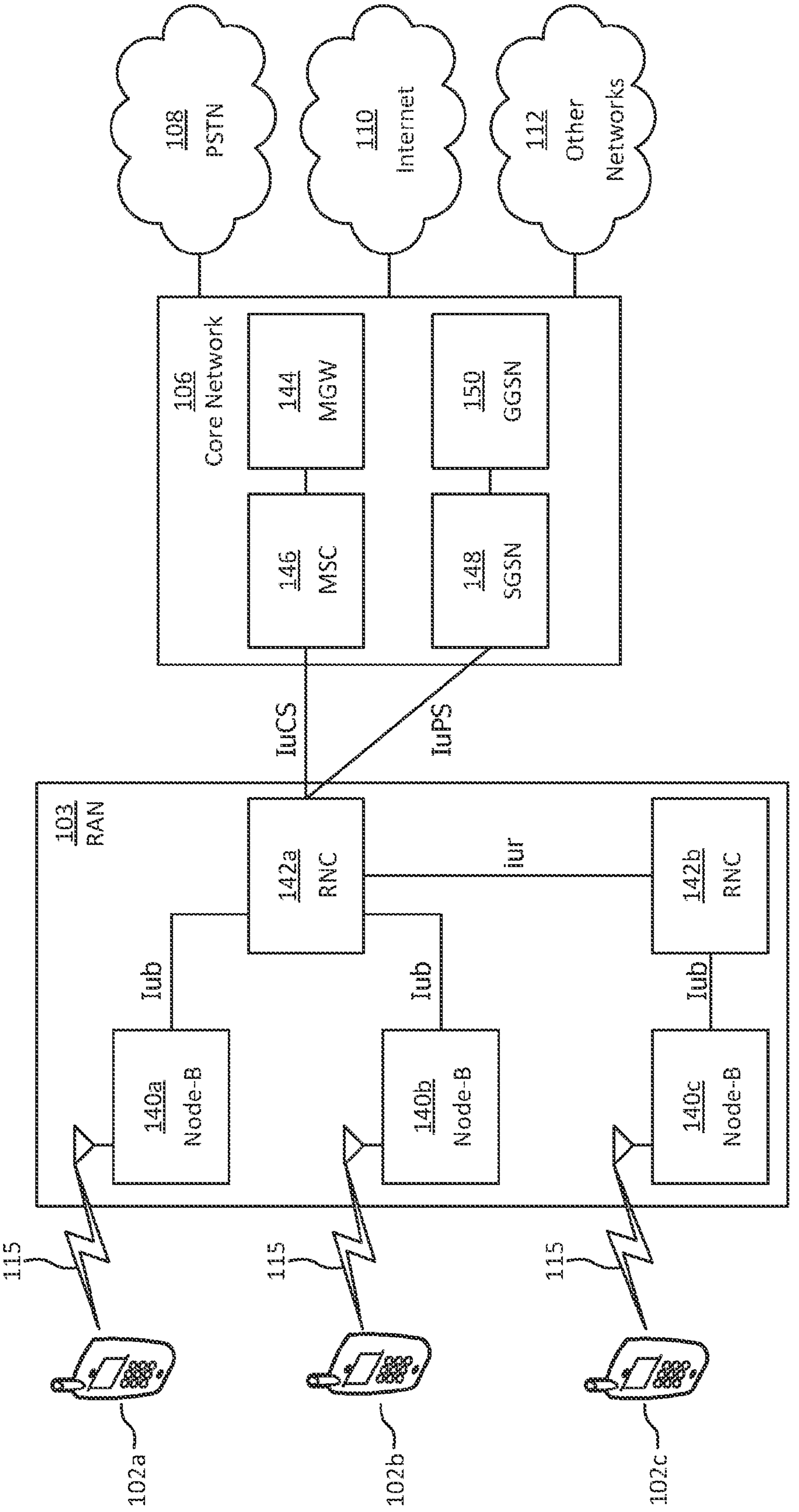
FIG. 9B illustrates an exemplary system that includes RANs and core networks.

FIG. 9B is a system diagram of an example RAN 103 and core network 106 that may implement methods, systems, and devices of multi-user sessions in edge data networks, as disclosed herein. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 9B, the RAN 103 may include Node-Bs 140*a*, 140*b*, and 140*c*, which may each include one or more transceivers for communicating with the WTRUs 102*a*, 102*b*, and 102*c* over the air interface 115. The Node-Bs 140*a*, 140*b*, and 140*c* may each be associated with a particular cell (not shown) within the RAN 103. The RAN 103 may also include RNCs 142*a*, 142*b*. It will be appreciated that the RAN 103 may include any number of Node-Bs and Radio Network Controllers (RNCs.)

As shown in FIG. 9B, the Node-Bs 140*a*, 140*b* may be in communication with the RNC 142*a*. Additionally, the Node-B 140*c* may be in communication with the RNC 142*b*. The Node-Bs 140*a*, 140*b*, and 140*c* may communicate with the respective RNCs 142*a* and 142*b* via an Iub interface. The RNCs 142*a* and 142*b* may be in communication with one another via an Iur interface. Each of the RNCs 142*a* and 142*b* may be configured to control the respective Node-Bs 140*a*, 140*b*, and 140*c* to which it is connected. In addition, each of the RNCs 142*a* and 142*b* may be configured to carry out or support other functionality, such as outer loop power control, load control, admission control, packet scheduling, handover control, macro-diversity, security functions, data encryption, and the like.

The core network 106 shown in FIG. 9B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, and 102*c* with access to circuit-switched networks, such as the PSTN 108, to facilitate communications between the WTRUs 102*a*, 102*b*, and 102*c*, and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, and 102*c* with access to packet-switched networks, such as the Internet 110, to facilitate communications between and the WTRUs 102*a*, 102*b*, and 102*c*, and IP-enabled devices.

The core network 106 may also be connected to the other networks 112, which may include other wired or wireless networks that are owned or operated by other service providers.

Figure 9C:
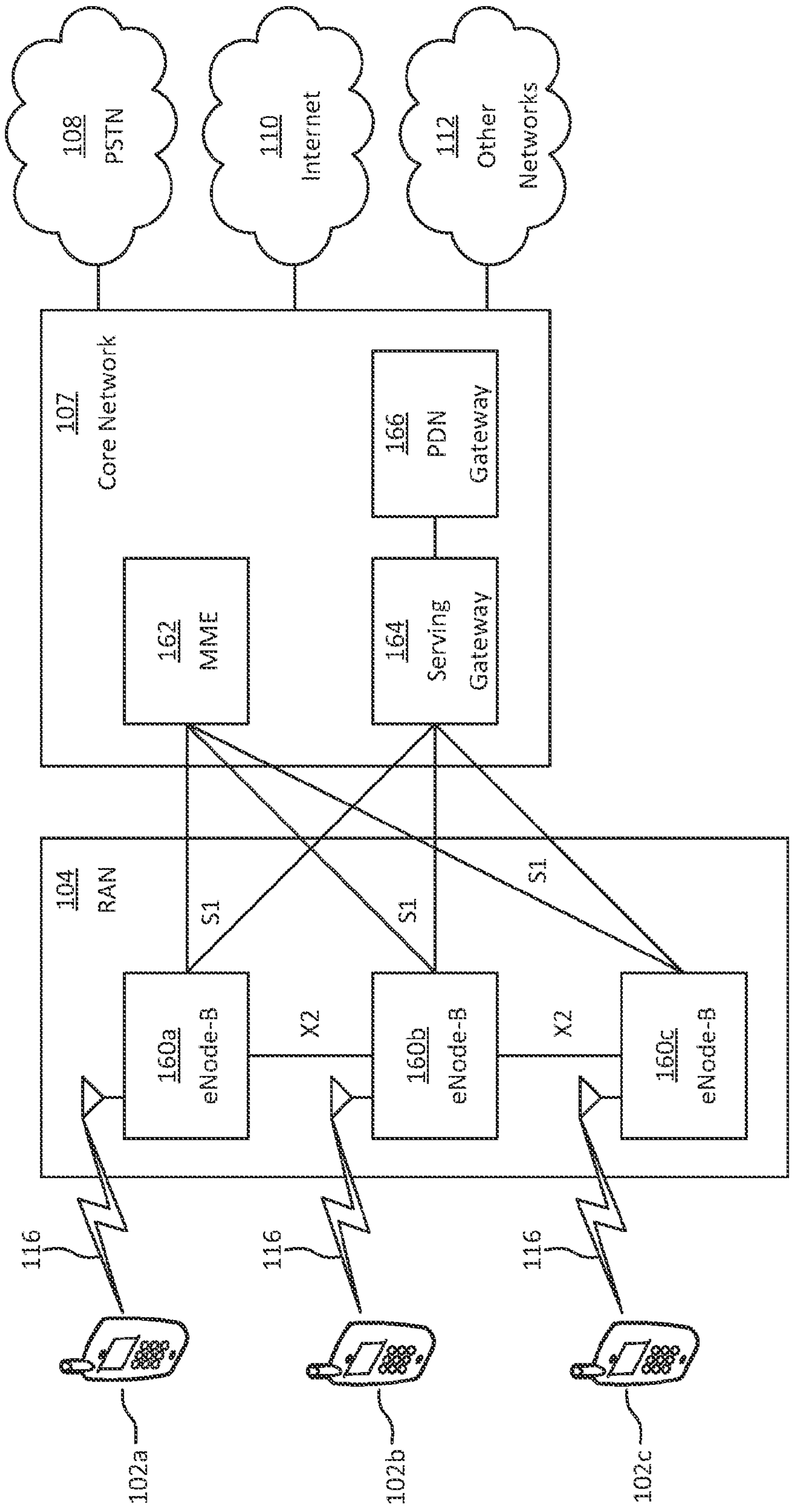
FIG. 9C illustrates an exemplary system that includes RANs and core networks.

FIG. 9C is a system diagram of an example RAN 104 and core network 107 that may implement methods, systems, and devices of multi-user sessions in edge data networks, as disclosed herein. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, and 160*c*, though it will be appreciated that the RAN 104 may include any number of eNode-Bs. The eNode-Bs 160*a*, 160*b*, and 160*c* may each include one or more transceivers for communicating with the WTRUs 102*a*, 102*b*, and 102*c* over the air interface 116. For example, the eNode-Bs 160*a*, 160*b*, and 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink or downlink, and the like. As shown in FIG. 9C, the eNode-Bs 160*a*, 160*b*, and 160*c* may communicate with one another over an X2 interface.

The core network 107 shown in FIG. 9C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, and 102*c*, bearer activation/deactivation, selecting a particular serving gateway during an initial attach of the WTRUs 102*a*, 102*b*, and 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, and 102*c*. The serving gateway 164 may also perform other functions, such as anchoring user planes during inter-eNode B handovers, triggering paging when downlink data is available for the WTRUs 102*a*, 102*b*, and 102*c*, managing and storing contexts of the WTRUs 102*a*, 102*b*, and 102*c*, and the like.

The serving gateway 164 may also be connected to the PDN gateway 166, which may provide the WTRUs 102*a*, 102*b*, and 102*c* with access to packet-switched networks, such as the Internet 110, to facilitate communications between the WTRUs 102*a*, 102*b*, 102*c*, and IP-enabled devices.

The core network 107 may facilitate communications with other networks. For example, the core network 107 may provide the WTRUs 102*a*, 102*b*, and 102*c* with access to circuit-switched networks, such as the PSTN 108, to facilitate communications between the WTRUs 102*a*, 102*b*, and 102*c* and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102*a*, 102*b*, and 102*c* with access to the networks 112, which may include other wired or wireless networks that are owned or operated by other service providers.

Figure 9D:
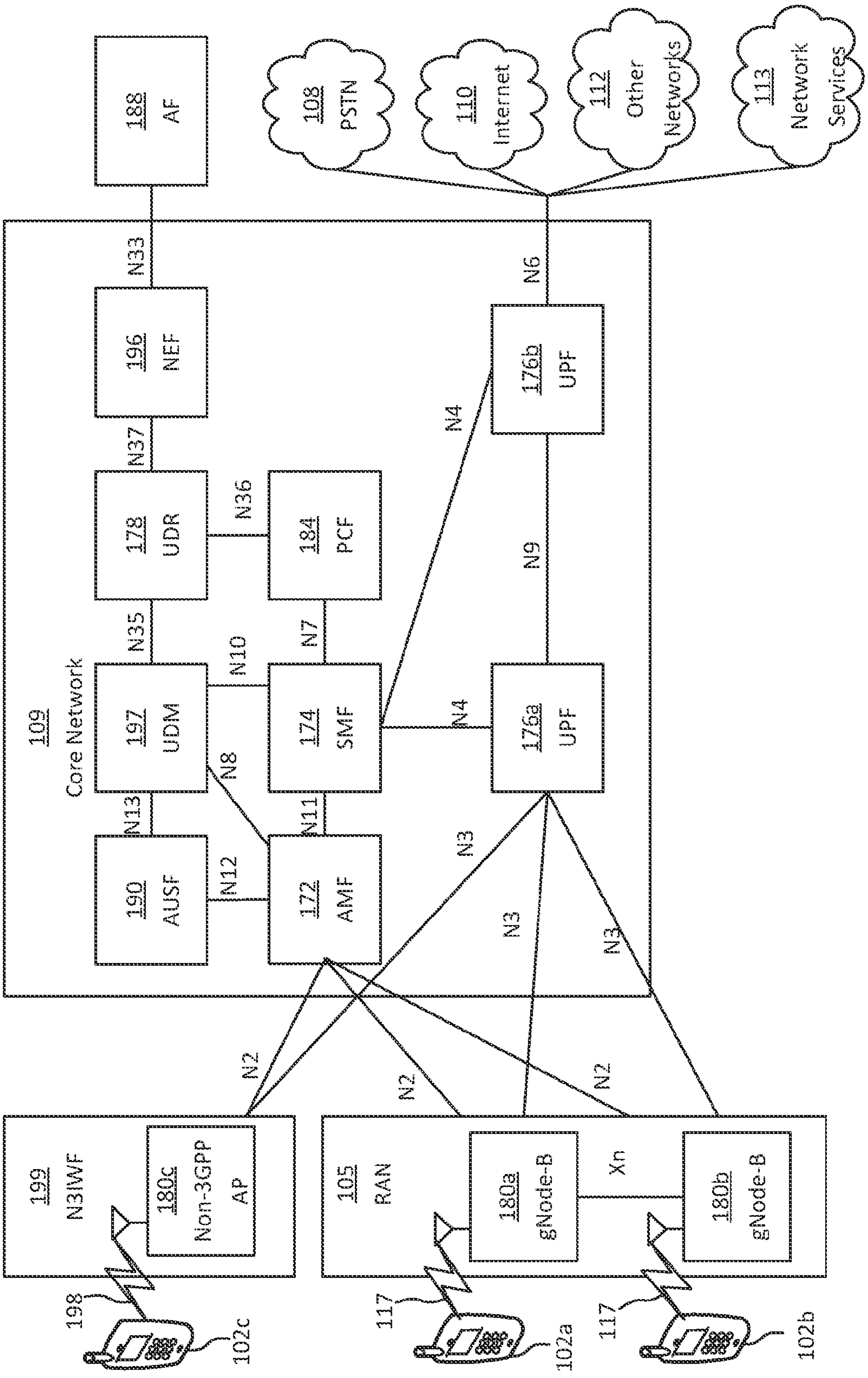
FIG. 9D illustrates an exemplary system that includes RANs and core networks.

FIG. 9D is a system diagram of an example RAN 105 and core network 109 that may implement methods, systems, and devices of multi-user sessions in edge data networks, as disclosed herein. The RAN 105 may employ an NR radio technology to communicate with the WTRUs 102*a* and 102*b* over the air interface 117. The RAN 105 may also be in communication with the core network 109. A Non-3GPP Interworking Function (N3IWF) 199 may employ a non-3GPP radio technology to communicate with the WTRU 102*c* over the air interface 198. The N3IWF 199 may also be in communication with the core network 109.

The RAN 105 may include gNode-Bs 180*a* and 180*b*. It will be appreciated that the RAN 105 may include any number of gNode-Bs. The gNode-Bs 180*a* and 180*b* may each include one or more transceivers for communicating with the WTRUs 102*a* and 102*b* over the air interface 117. When integrated access and backhaul connection are used, the same air interface may be used between the WTRUs and gNode-Bs, which may be the core network 109 via one or multiple gNBs. The gNode-Bs 180*a* and 180*b* may implement MIMO, MU-MIMO, or digital beamforming technology. Thus, the gNode-B 180*a*, for example, may use multiple antennas to transmit wireless signals to, and receive wireless signals from, the WTRU 102*a*. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180*c*. It will be appreciated that the N3IWF 199 may include any number of non-3GPP Access Points. The non-3GPP Access Point 180*c* may include one or more transceivers for communicating with the WTRUs 102*c* over the air interface 198. The non-3GPP Access Point 180*c* may use the 802.11 protocol to communicate with the WTRU 102*c* over the air interface 198.

Each of the gNode-Bs 180*a* and 180*b* may be associated with a particular cell (not shown) and may be configured to handle radio resource management decisions, handover decisions, scheduling of users in the uplink or downlink, and the like. As shown in FIG. 9D, the gNode-Bs 180*a* and 180*b* may communicate with one another over an Xn interface, for example.

The core network 109 shown in FIG. 9D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 9G.

In the example of FIG. 9D, the 5G Core Network 109 may include an access and mobility management function (AMF) 172, a Session Management Function (SMF) 174, User Plane Functions (UPFs) 176*a* and 176*b*, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 9D shows that network functions directly connect with one another, however, it should be appreciated that they may communicate via routing agents such as a diameter routing agent or message buses.

In the example of FIG. 9D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102*a*, 102*b*, and 102*c* via an N1 interface. The N1 interface is not shown in FIG. 9D.

The SMF 174 may be connected to the AMF 172 via an N11 interface. Similarly, the SMF may be connected to the PCF 184 via an N7 interface, and to the UPFs 176*a* and 176*b* via an N4 interface. The SMF 174 may serve as a control node. For example, the SMF 174 may be responsible for Session Management, IP address allocation for the WTRUs 102*a*, 102*b*, and 102*c*, management and configuration of traffic steering rules in the UPF 176*a* and UPF 176*b*, and generation of downlink data notifications to the AMF 172.

The UPF 176*a* and UPF176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example, Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 9D. The PCF 184 may provide policy rules to control plane nodes such as the AMF 172 and SMF 174, allowing the control plane nodes to enforce these rules. The PCF 184 may send policies to the AMF 172 for the WTRUs 102*a*, 102*b*, and 102*c* so that the AMF may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface, and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 9D, in a network slicing scenario, a WTRU 102*a*, 102*b*, or 102*c* may connect with an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned or operated by other service providers.

The core network entities described herein and illustrated in FIG. 9A, FIG. 9C, FIG. 9D, or FIG. 9E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 9A, FIG. 9B, FIG. 9C, FIG. 9D, or FIG. 9E are provided by way of example only, and it is understood that the subject matter disclosed and claimed herein may be embodied or implemented in any similar communication system, whether presently defined or defined in the future.

Figure 9E:
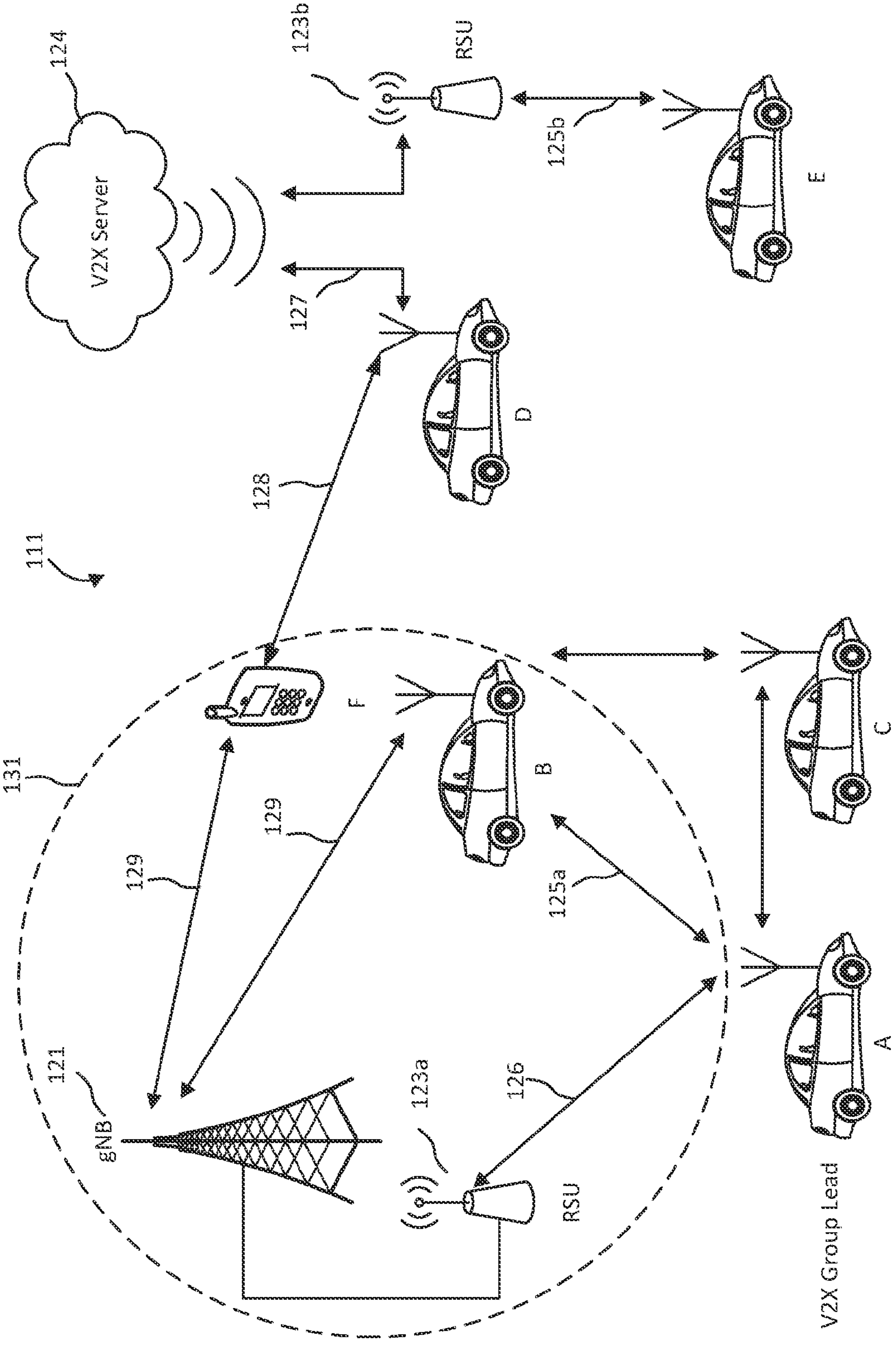
FIG. 9E illustrates another example communications system.

FIG. 9E illustrates an example communications system 111 in which the systems, methods, apparatuses that implement multi-user sessions in edge data networks, described herein, may be used. Communications system 111 may include Wireless Transmit/Receive Units (WTRUs) A, B, C, D, E, F, a base station gNB 121, a V2X server 124, and Roadside Units (RSUs) 123*a* and 123*b*. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 9E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 9E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 9F:
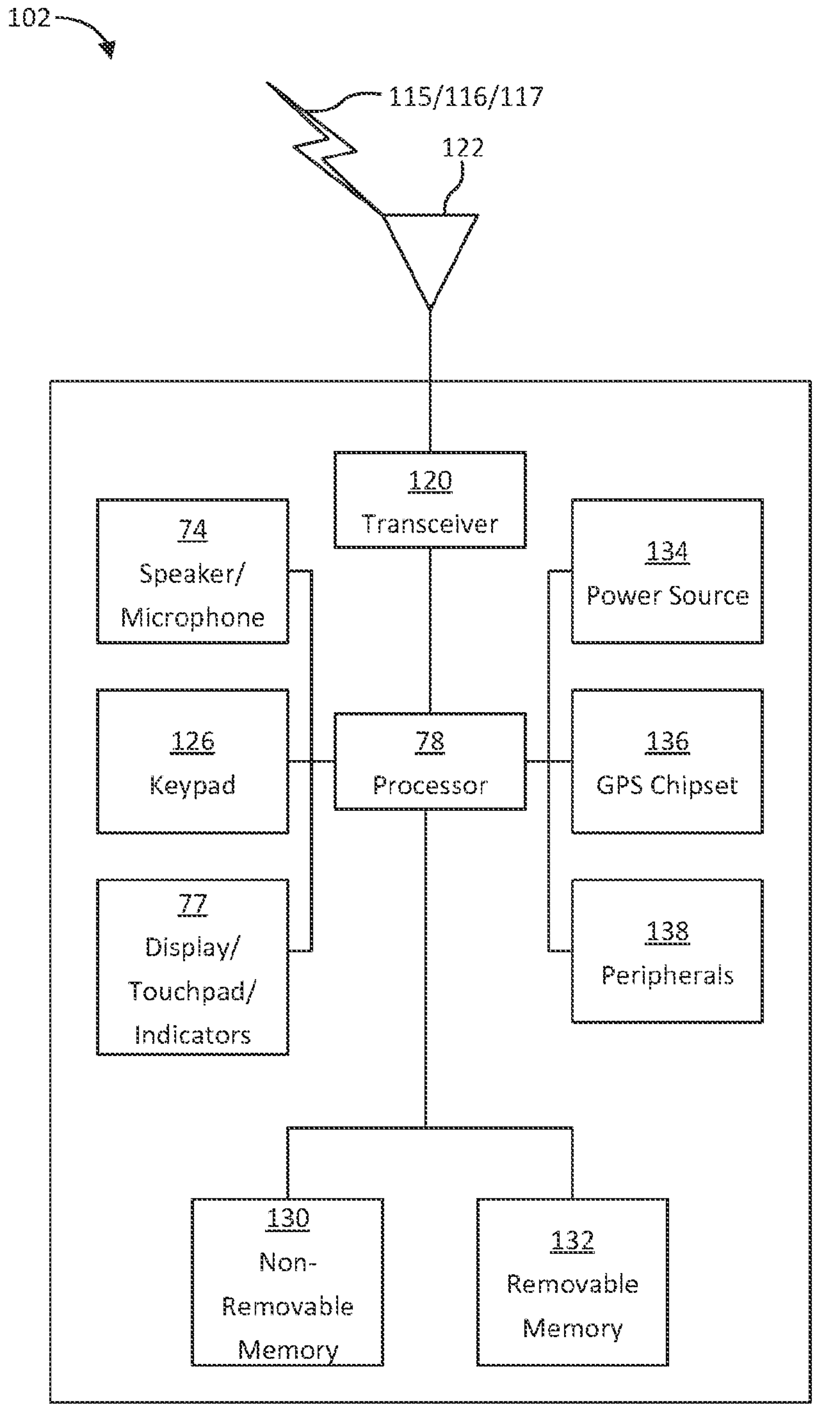
FIG. 9F is a block diagram of an example apparatus or device, such as a WTRU.

FIG. 9F is a block diagram of an example apparatus or device WTRU 102 that may be configured for wireless communications and operations in accordance with the systems, methods, and apparatuses that implement multi-user sessions in edge data networks, described herein, such as a WTRU 102 of FIG. 9A, FIG. 9B, FIG. 9C, FIG. 9D, or FIG. 9E, or FIG. 4-FIG. 8. As shown in FIG. 9F, the example WTRU 102 may include a processor 78, a transceiver 120, a transmit/receive element 122, a speaker/microphone 74, a keypad 126, a display/touchpad/indicators 77, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114*a* and 114*b*, or the nodes that base stations 114*a* and 114*b* may represent, such as transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 9F and may be an exemplary implementation that performs the disclosed systems and methods for multi-user sessions in edge data networks described herein.

The processor 78 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 78 may perform signal coding, data processing, power control, input/output processing, or any other functionality that enables the WTRU 102 to operate in a wireless environment. The processor 78 may be coupled to the transceiver 120, which may be coupled to the transmit/receive element 122. While FIG. 9F depicts the processor 78 and the transceiver 120 as separate components, it will be appreciated that the processor 78 and the transceiver 120 may be integrated together in an electronic package or chip.

The transmit/receive element 122 of a UE may be configured to transmit signals to, or receive signals from, a base station (e.g., the base station 114*a* of FIG. 9A) over the air interface 115/116/117 or another UE over the air interface 115*d*/116*d*/117*d*. For example, the transmit/receive element 122 may be an antenna configured to transmit or receive RF signals. The transmit/receive element 122 may be an emitter/detector configured to transmit or receive IR, UV, Radar, LIDAR, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 9F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 78 of the WTRU 102 may be coupled to, and may receive user input data from, the speaker/microphone 74, the keypad 126, or the display/touchpad/indicators 77 (e.g., a liquid crystal display (LCD) display unit or organic light-emitting diode (OLED) display unit. The processor 78 may also output user data to the speaker/microphone 74, the keypad 126, or the display/touchpad/indicators 77. In addition, the processor 78 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 78 may access information from, and store data in, memory that is not physically located on the WTRU 102, such as on a server that is hosted in the cloud or in an edge computing platform or in a home computer (not shown). The processor 78 may be configured to control lighting patterns, images, or colors on the display or indicators 77 in response to whether the setup of multi-user sessions in edge data networks in some of the examples described herein are successful or unsuccessful, or otherwise indicate a status of multi-user sessions in edge data networks and associated components. The control lighting patterns, images, or colors on the display or indicators 77 may be reflective of the status of any of the method flows or components in the FIGS. illustrated or discussed herein (e.g., FIG. 3-FIG. 8, etc.). Disclosed herein are messages and procedures of multi-user sessions in edge data networks. The messages and procedures may be extended to provide interface/API for users to request resources via an input source (e.g., speaker/microphone 74, keypad 126, or display/touchpad/indicators 77) and request, configure, or query multi-user sessions in edge data networks related information, among other things that may be displayed on display 77.

The processor 78 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 78 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) or determine its location based on the timing of the signals being received from two or more nearby base stations. It will be appreciated that the WTRU 102 may acquire location information by way of any suitable location-determination method.

The processor 78 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 9G:
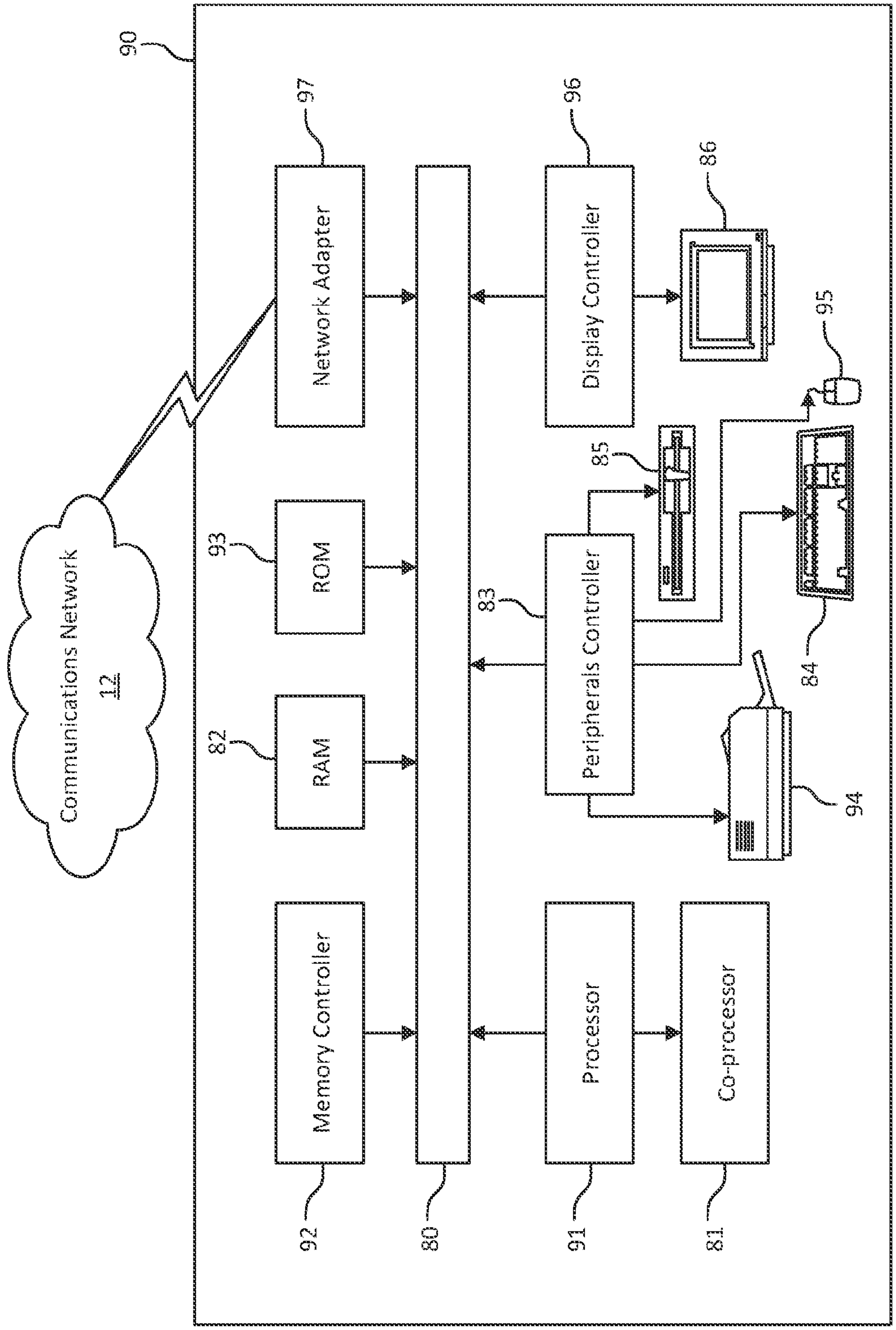
FIG. 9G is a block diagram of an exemplary computing system.

FIG. 9G is a block diagram of an exemplary computing system 90 in which one or more apparatuses of the communications networks illustrated in FIG. 9A, FIG. 9C, FIG. 9D and FIG. 9E as well as multi-user sessions in edge data networks, such as the systems and methods illustrated in FIG. 3 through FIG. 8 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for multi-user sessions in edge data networks.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 9A, FIG. 9B, FIG. 9C, FIG. 9D, or FIG. 9E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 78 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—multi-user sessions in edge data networks—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for multi-user sessions in edge data networks. In an example, a multi-user session server (MSS) may be configured to: receive requests from a multi-user session client (MSC) for establishing, modifying, discovering, subscribing to, or tearing-down a multi-user session involving multiple EAS instances supporting the same type of service from the same ASP, but deployed in different EDNs, where the request may include information elements defined in Table 1; processes the request by authenticating the MSC, checking if the MSC is authorized to perform the multi-user session request, and if authorized, perform the requested multi-user session establishment, modification, discovery, subscription or tear down operation; initiate one or more requests to other entities in the system such as a group management server, network exposure function, OAM servers, or another MSS to perform one or more operations defined in Table 2; send a response to the MSC including a status of the multi-user session operation performed and one or more information elements defined in Table 1; and send a multi-user session notification to a MSC when an event of interest defined within the notification criteria of a multi-user session subscription is detected. All combinations (including the removal or addition of steps) in this paragraph and the below paragraphs are contemplated in a manner that is consistent with the other portions of the detailed description.

In an example, a multi-user session client (MSC) may be configured to: transmit requests to a multi-user session server (MSS) for establishing, modifying, discovering, subscribing to, or tearing-down a multi-user session involving multiple EAS instances supporting the same type of service from the same ASP, but deployed in different EDNs, where the request may include information elements defined in Table 1; receive a response from the MSS including a status of the multi-user session operation performed and one or more information elements defined in Table 1; and receive a multi-user session notification from the MSS when an event of interest defined within the notification criteria of a multi-user session subscription is detected. All combinations (including the removal or addition of steps) in this paragraph and the below paragraphs are contemplated in a manner that is consistent with the other portions of the detailed description.

In an example, an edge enabler client (EEC) may be configured to: receive request(s) from AC(s) comprising multi-user session information defined in Table 1; and transmit request(s) to an EES and/or ECS comprising multi-user session information defined in Table 1, wherein the requests may be a registration request, service provisioning request or a dedicated multi-user session request. All combinations (including the removal or addition of steps) in this paragraph and the below paragraphs are contemplated in a manner that is consistent with the other portions of the detailed description.

In an example, an edge enabler server (EES) may be configured to: receive request(s) from EEC(s) and/or EAS(s) comprising multi-user session information defined in Table 1, wherein the requests may be a registration request or a dedicated multi-user session request; receive subscriptions requests from EAS(s) that includes notification criteria specifying a multi-user session ID and/or multi-user session event of interest (e.g., multi-user session establishment, modification, or tear down related events, etc.); monitors for the occurrence of multi-user session related events defined within the subscription, wherein the EES may in turn subscribe to other entity(s) in the system to assist it with detecting multi-user session events; share multi-user session information with other EESs and use this information to synchronize the multi-user session aware operations performed by the EESs; perform one or more multi-user session aware operations defined in Table 2; subscribe to other EESs to receive notifications regarding multi-user session events; receive a multi-user session notification that includes information regarding a multi-user session event that has occurred and perform multi-user session aware operations defined in Table 2 to synchronize multi-user session resources across edge data networks; and transmit multi-user session notifications to other EESs and/or EASs that include information regarding a multi-user session event that has occurred. All combinations (including the removal or addition of steps) in this paragraph and the below paragraphs are contemplated in a manner that is consistent with the other portions of the detailed description.

Methods, systems, and apparatuses, among other things, as described herein may provide for multi-user sessions in edge data networks. In an example, receiving a first request to establish a multi-user session between two or more application clients (ACs) hosted on different user devices, wherein each AC uses services from a different edge application server (EAS), and wherein the multi-user session enables the EASs to share information to enable interaction between the ACs; receiving a first request to establish a multi-user session between the ACs, wherein the request comprises multi-user session information; establishing the multi-user session between the ACs, wherein establishing the multi-user session comprises sending requests to the different EASs; receiving responses from the different EASs comprising indications of whether the EASs agree to provide multi-user session services to the ACs; based on the responses, determining whether a multi-user session has been established; and sending a response to the first request, wherein the response comprises an indication that the multi-user session has been established between the ACs. The first request may be received from an Edge Enabler Client (EEC) or an Edge Application Server (EAS). The multi-user session information may include one or more AC identifiers. The multi-user session information may include a required connection bandwidth. The multi-user session information may include a required request rate or a scheduled communication time. Methods, systems, and apparatuses, among other things, as described herein may provide for sending one or more requests to a network slice management function to synchronize network slices used by each of the multi-user session ACs for communication with their respective EASs. Methods, systems, and apparatuses, among other things, as described herein may provide for sending one or more requests to a QoS configuration function to synchronize QoS settings of the network connections used by each of the multi-user session ACs when communicating with their respective EASs. Methods, systems, and apparatuses, among other things, as described herein may provide for sending one or more requests to a communication pattern configuration function to synchronize scheduled communication times when each of the multi-user session ACs communicates with their respective EASs. The different EAS instances may support the same type of service. Methods, systems, and apparatuses, among other things, as described herein may provide for EES sending a request to another EES to synchronize multi-user session operations performed by the EESs, wherein the request comprises multi-user session information. The methods may be performed by an edge enabler server (EES), or other logical or functional apparatus herein.

Methods, systems, and apparatuses, among other things, as described herein may provide for receiving a first request to establish a multi-user session between two or more application clients (ACs) hosted on different user devices, wherein the two or more ACs comprise a first AC and a second AC, wherein the first AC and the second AC uses services from a first edge application server (EAS) and second EAS, wherein the first EAS and the second EAS are different, and wherein the multi-user session enables the first EAS and the second EAS to share information to enable interaction between the first AC and the second AC. All combinations (including the removal or addition of steps) in this paragraph and the below paragraphs are contemplated in a manner that is consistent with the other portions of the detailed description.

Methods, systems, and apparatuses, among other things, as described herein may provide for receiving a first request to establish a multi-user session between the a first application client (AC) and a second AC, wherein the first request comprises multi-user session information; establishing the multi-user session between the first AC and the second AC, wherein establishing the multi-user session comprises sending one or more requests to different edge application servers (EASs), wherein the different EASs comprises a first EAS and a second EAS; receiving one or more responses from the different EASs, wherein the one or more responses comprises one or more indications of whether the different EASs agree to provide a multi-user session service to the first AC and the second AC; based on the one or more responses from the different EASs, determining whether the multi-user session has been established; and sending a first response to the first request, wherein the first response comprises an indication that the multi-user session has been established between the first AC and the second AC. The first request is received from an edge enabler client (EEC) or a third EAS. The multi-user session information may include one or more AC identifiers. The multi-user session information may include a connection bandwidth, a request rate, or a scheduled communication time. Methods, systems, and apparatuses, among other things, as described herein may provide for sending one or more requests to a network slice management function to synchronize network slices used by the first AC or the second AC for communication with respective EASs. Methods, systems, and apparatuses, among other things, as described herein may provide for sending one or more requests to a QoS configuration function to synchronize QoS settings of network connections used by the first AC or the second AC when communicating with respective EASs. Methods, systems, and apparatuses, among other things, as described herein may provide for sending one or more requests to a communication pattern configuration function to synchronize scheduled communication times when the first AC or the second AC communicates with their respective EASs. The different EASs may support the same type of service. Methods, systems, and apparatuses, among other things, as described herein may provide for sending one or more requests to a second EES to synchronize multi-user session operations performed by the first EES and the second EES, wherein the one or more requests to the second EES comprises multi-user session information. The apparatuses may include cloud servers, edge servers, or other devices. All combinations (including the removal or addition of steps) in this paragraph and the below paragraphs are contemplated in a manner that is consistent with the other portions of the detailed description.

What is claimed:

1. A method performed by a first edge enabler server (EES), the method comprising:

receiving a first request to establish a multi-user session between a first application client (AC) and a second AC, wherein the first request comprises multi-user session information;

establishing the multi-user session between the first AC and the second AC, wherein establishing the multi-user session comprises sending one or more requests to different edge application servers (EASs), wherein the different EASs comprises a first EAS and a second EAS;

receiving one or more responses from the different EASs, wherein the one or more responses comprises one or more indications of whether the different EASs agree to provide a multi-user session service to the first AC and the second AC;

based on the one or more responses from the different EASs, determining that the multi-user session has been established; and sending a first response to the first request to the first EAS or the second EAS based on the determination that the multi-user session has been established, wherein the first response comprises an indication that the multi-user session has been established between the first AC and the second AC.

2. The method of claim 1, wherein the first request is received from an edge enabler client (EEC) or a third EAS.

3. The method of claim 1, wherein the multi-user session information comprises one or more AC identifiers.

4. The method of claim 1, wherein the multi-user session information comprises a connection bandwidth.

5. The method of claim 1, wherein the multi-user session information comprises a request rate.

6. The method of claim 1, wherein the multi-user session information comprises a scheduled communication time.

7. The method of claim 1, further comprising sending one or more requests to a network slice management function to synchronize network slices used by the first AC or the second AC for communication with respective EASs.

8. The method of claim 1, further comprising sending one or more requests to a quality of service (QoS) configuration function to, when communicating with respective EASs, synchronize QoS settings of network connections used by the first AC or the second AC.

9. The method of claim 1, further comprising sending one or more requests to a communication pattern configuration function to, when the first AC or the second AC communicates with their respective EASs, synchronize scheduled communication times.

10. The method of claim 1, wherein the different EASs support a same type of service.

11. The method of claim 1, further comprising sending one or more requests to a second EES to synchronize multi-user session operations performed by the first EES and the second EES, wherein the one or more requests to the second EES comprises multi-user session information.

12. An apparatus comprising:

a processor; and a memory coupled with the processor, the memory storing executable instructions that are configured to, when executed by the processor, cause the processor to:

receive a first request to establish a multi-user session between a first application client (AC) and a second AC, wherein the first request comprises multi-user session information;

establish the multi-user session between the first AC and the second AC, wherein establishing the multi-user session comprises sending one or more requests to different edge application servers (EASs), wherein the different EASs comprises a first EAS and a second EAS;

receive one or more responses from the different EASs, wherein the one or more responses comprises one or more indications of whether the different EASs agree to provide a multi-user session service to the first AC and the second AC;

based on the one or more responses from the different EASs, determine that the multi-user session has been established; and send a first response to the first request to the first EAS or the second EAS based on the determination that the multi-user session has been established, wherein the first response comprises an indication that the multi-user session has been established between the first AC and the second AC.

13. The apparatus of claim 12, wherein the executable instructions are configured to, when executed by the processor, cause the processor to receive the first request from an edge enabler client (EEC) or a third EAS.

14. The apparatus of claim 12, wherein the multi-user session information comprises one or more AC identifiers or a connection bandwidth.

15. The apparatus of claim 12, wherein the multi-user session information comprises a request rate or a scheduled communication time.

16. The apparatus of claim 12, wherein the executable instructions are configured to, when executed by the processor, cause the processor to send one or more requests to a network slice management function to synchronize network slices used by the first AC or the second AC for communication with respective EASs.

17. The apparatus of claim 12, wherein the executable instructions are configured to, when executed by the processor, cause the processor to send one or more requests to a quality of service (QoS) configuration function to, when communicating with respective EASs, synchronize QoS settings of network connections used by the first AC or the second AC.

18. The apparatus of claim 12, wherein the executable instructions are configured to, when executed by the processor, cause the processor to send one or more requests to a communication pattern configuration function to, when the first AC or the second AC communicates with their respective EASs, synchronize scheduled communication times.

19. A non-transitory computer readable storage medium configured to communicate over a third generation partnership (3GPP) network, the non-transitory computer readable medium storing computer executable instructions that are configured to, when executed by a computing device, cause the computing device to:

receive a first request to establish a multi-user session between a first application client (AC) and a second AC, wherein the first request comprises multi-user session information;

establish the multi-user session between the first AC and the second AC, wherein establishing the multi-user session comprises sending one or more requests to different edge application servers (EASs), wherein the different EASs comprises a first EAS and a second EAS;

receive one or more responses from the different EASs, wherein the one or more responses comprises one or more indications of whether the different EASs agree to provide a multi-user session service to the first AC and the second AC;

based on the one or more responses from the different EASs, determine that the multi-user session has been established; and send a first response to the first request to the first EAS or the second EAS based on the determination that the multi-user session has been established, wherein the first response comprises an indication that the multi-user session has been established between the first AC and the second AC.

20. The non-transitory computer readable storage medium of claim 19, wherein the multi-user session information comprises one or more AC identifiers, a connection bandwidth, a request rate, or a scheduled communication time.

* * * * *